United States Patent
Chun

(10) Patent No.: US 11,259,269 B2
(45) Date of Patent: Feb. 22, 2022

(54) METHOD AND BASE STATION FOR PERFORMING PAGING, AND METHOD AND NETWORK ENTITY FOR SUPPORTING PAGING

(71) Applicant: LG ELECTRONICS INC., Seoul (KR)

(72) Inventor: Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 16/494,515

(22) PCT Filed: Mar. 16, 2018

(86) PCT No.: PCT/KR2018/003090
§ 371 (c)(1),
(2) Date: Sep. 16, 2019

(87) PCT Pub. No.: WO2018/169343
PCT Pub. Date: Sep. 20, 2018

(65) Prior Publication Data
US 2020/0015192 A1    Jan. 9, 2020

Related U.S. Application Data

(60) Provisional application No. 62/472,595, filed on Mar. 17, 2017, provisional application No. 62/474,600, filed on Mar. 21, 2017.

(51) Int. Cl.
*H04W 68/02* (2009.01)
*H04W 8/08* (2009.01)
(Continued)

(52) U.S. Cl.
CPC .......... *H04W 68/02* (2013.01); *H04W 8/08* (2013.01); *H04W 60/00* (2013.01); *H04W 76/10* (2018.02); *H04W 76/27* (2018.02); *H04W 88/04* (2013.01)

(58) Field of Classification Search
CPC ..... H04W 68/02; H04W 88/04; H04W 60/00; H04W 76/10; H04W 76/27; H04W 8/08; H04W 76/28; H04W 8/005; H04L 67/16
See application file for complete search history.

(56) References Cited

U.S. PATENT DOCUMENTS

2016/0262068 A1    9/2016   Won et al.
2020/0068380 A1*   2/2020   Wallentin ............ H04W 68/005

FOREIGN PATENT DOCUMENTS

WO    2017/026872 A1    2/2017
WO    2017/032884 A1    3/2017
WO    2017/043854 A1    3/2017

OTHER PUBLICATIONS

3GPP TS 23.303 V14.1.0, "Proximity-based services (ProSe); Stage 2 (Release 14)", Dec. 16, 2016, pp. 97-103.

* cited by examiner

*Primary Examiner* — Kevin C. Harper
*Assistant Examiner* — Derrick V Rose
(74) *Attorney, Agent, or Firm* — Dentons US LLP

(57) ABSTRACT

In a wireless communication system, when a remote user equipment (UE) accesses a network via a relay UE, a base station provides an identifier of a mobility management entity (MME; relay UE MME) of the relay UE to an MME (remote UE MME) of the remote UE. When paging for the remote UE is required while the remote UE is connected to a network via the relay UE, the remote UE MME transmits a request for paging for the remote UE to the relay UE MME, and the relay UE MME transmits a paging notification to the relay UE or starts a paging process for the relay UE through the base station.

12 Claims, 15 Drawing Sheets

(51) Int. Cl.
  *H04W 60/00*  (2009.01)
  *H04W 76/27*  (2018.01)
  *H04W 76/10*  (2018.01)
  *H04W 88/04*  (2009.01)

(a) UE-P-GW user plane with E-UTRAN (b) Control Plane UE-MME (a) UE-1 and UE-2 campin on different eNBs (b) UE-1 and UE-2 camping on same eNB

METHOD AND BASE STATION FOR PERFORMING PAGING, AND METHOD AND NETWORK ENTITY FOR SUPPORTING PAGING

This application is the National Stage filing under 35 U.S.C. 371 of International Application No. PCT/KR2018/003090, filed on Mar. 16, 2018, which claims the benefit of U.S. Provisional Applications No. 62/472,595, filed on Mar. 17, 2017 and 62/474,600, filed on Mar. 21, 2017, the contents of which are all hereby incorporated by reference herein in their entirety.

TECHNICAL FIELD

The present disclosure relates to a wireless communication system and, more particularly, to a method of performing or supporting a user equipment and an apparatus therefor.

BACKGROUND ART

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits data and/or control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Further, a method of efficiently transmitting/receiving a signal in a system supporting new radio access technology is needed.

In addition, to save power of a remote UE when the remote UE is connected to a network via a relay UE, a method of effectively delivering a terminating call to the remote UE linked to the relay UE is needed.

The technical objects that can be achieved through the present disclosure are not limited to what has been particularly described hereinabove and other technical objects not described herein will be more clearly understood by persons skilled in the art from the following detailed description.

Technical Solution

According to an aspect of the present disclosure, provided herein is a method of performing paging by a base station (BS) in a wireless communication system. The method includes: transmitting, to a mobility management entity (MME) of a remote user equipment (UE) (remote UE MME), an identity of an MME of a relay UE (relay UE MME) to which a remote UE is linked; receiving a first paging message from the relay UE MME; and transmitting a second paging message including the first paging message to the relay UE. The first paging message includes information indicating that there is paging for the remote UE or includes paging for the remote UE.

In another aspect of the present disclosure, provided herein is a base station (BS) for performing paging in a wireless communication system. The BS includes a transmission (Tx)/reception (Rx) module, and a processor configured to control the Tx/Rx module. The processor is configured to: control the Tx/Rx module to transmit, to a mobility management entity (MME) of a remote user equipment (UE), an identity of an MME of a relay user equipment (UE) (relay UE MME) to which a remote UE is linked; control the Tx/Rx module to receive a first paging message from the relay UE MME; and control the Tx/Rx module to transmit a second paging message including the first paging message to the relay UE. The first paging message includes information indicating that there is paging for the remote UE or includes paging for the remote UE.

In another aspect of the present disclosure, provided herein is a mobility management entity (MME) of a remote user equipment (UE) for supporting paging in a wireless communication system. The remote UE MME includes a transmission (Tx)/reception (Rx) module, and a processor configured to control the Tx/Rx module. The processor is configured to: control the Tx/Rx module to receive an identity of an MME of a relay UE (relay UE MME) and a registration request message of the remote UE from a base station (BS); and control the Tx/Rx module to transmit a paging request message for the remote UE to the relay UE MME, when downlink data for the remote UE is received and when the remote UE is connected to a network through the relay UE.

In another aspect of the present disclosure, provided herein is a mobility management entity (MME) of a relay user equipment (UE) (relay UE MME) for supporting paging in a wireless communication system. The relay UE MME includes a transmission (Tx)/reception (Rx) module, and a processor configured to control the Tx/Rx module. The processor is configured to: control the Tx/Rx module to receive a paging request message for the remote UE from an MME of a remote UE (remote UE MME); and control the Tx/Rx module to transmit a paging message to a base station (BS) of the relay UE based on the paging request message. The paging message includes information indicating that there is paging for the remote UE or includes paging for the remote UE.

In each aspect of the present disclosure, the identity of the relay UE MME may be transmitted to the remote UE MME upon receiving a registration request message of the remote UE through radio resource control (RRC) connection established between the relay UE and the BS.

In each aspect of the present disclosure, if the relay UE is in an idle mode when the second paging message is transmitted, the second paging message may be transmitted on a paging occasion of the relay UE.

In each aspect of the present disclosure, the BS may receive information indicating that the first paging message is related to the remote UE, together with the first paging message, from the relay UE MME. The BS may transmit information indicating that the second paging message is related to the remote UE, together with the second paging message, to the relay UE.

In each aspect of the present disclosure, the paging request message transmitted by the remote UE MME to the relay UE MME may include information about the relay UE, information about the remote UE, or information about the remote UE MME.

The above technical solutions are merely some parts of the embodiments of the present disclosure and various embodiments into which the technical features of the present disclosure are incorporated can be derived and understood by persons skilled in the art from the following detailed description of the present disclosure.

Advantageous Effects

According to the present disclosure, uplink/downlink signals can be efficiently transmitted/received. Therefore, overall throughput of a radio communication system can be improved.

According to an embodiment of the present disclosure, latency/delay generated in a communication process between a UE and a BS may be lowered.

With development of smart devices, a small amount of data may be efficiently transmitted/received or data with a low frequency may be efficiently transmitted/received.

In a system supporting new radio access technology, signals may be efficiently transmitted/received.

When a remote UE is connected to a network through a relay UE, a terminating call is effectively transmitted to the remote UE linked to the relay UE so that power of the remote UE may be reduced.

It will be appreciated by persons skilled in the art that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure, illustrate embodiments of the disclosure and together with the description serve to explain the principle of the disclosure.

MODE FOR CARRYING OUT THE INVENTION

Figure 1:
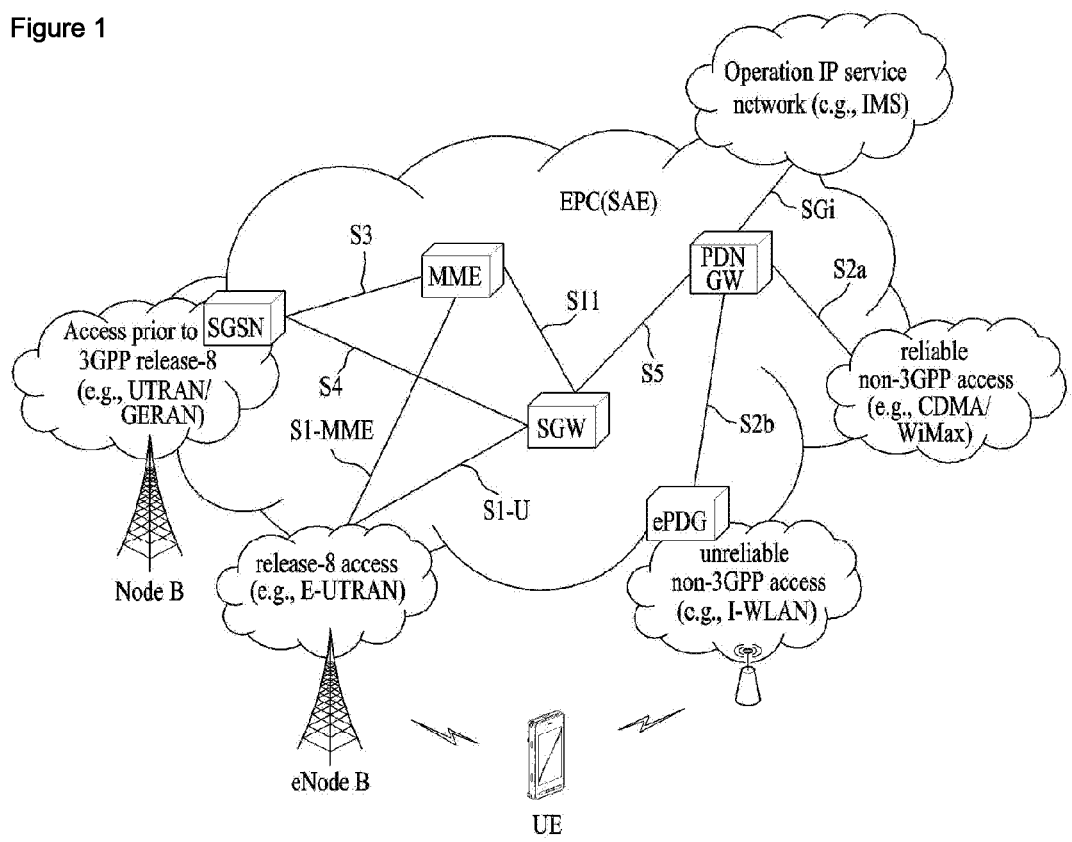
FIG. 1 is a schematic diagram showing the structure of an evolved packet system (EPS) including an evolved packet core (EPC).

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present disclosure described hereinbelow are combinations of elements and features of the present disclosure. The elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

The embodiments of the present disclosure can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present disclosure may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, 3GPP TS 24.301, 3GPP TS 23.228, 3GPP TS 29.228, 3GPP TS 23.218, 3GPP TS 22.011, 3GPP TS 36.413 and 3GPP TS 23.303 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

Specific terms used for the embodiments of the present disclosure are provided to aid in understanding of the present disclosure. These specific terms may be replaced with other terms within the scope and spirit of the present disclosure.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an S1 signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB, or gNB, and an RNC (Radio Network Controller) for controlling the NodeB and the eNodeB in a 3GPP network. The RAN is present between a UE and a core network, and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network. FIG. 1 is a schematic diagram showing the structure of an evolved packet system (EPS) including an evolved packet core (EPC).

gNB: A node that provides NR user plane and control plane protocol terminations towards a UE and is connected to a 5G core network (5GC) via a next generation (NG) interface (e.g., NG-C or NG-U).

5G access network (AN): An AN including an NG RAN and/or a non-3GPP AN connecting to a 5GC.

5G system: A 3GPP system consisting of a 5G AN, a 5GC, and a UE. The 5G system is also called a new radio (NR) system or an NG system.

NGAP UE association: A logical per-UE association between a 5G-AN node and an AMF.

NF service: Functionality exposed by a network function (NF) through a service based interface and consumed by other authorized NFs.

NG-RAN: A radio access network connected to a 5GC in a 5G system.

NG-C: A control plane interface between an NG-RAN and a 5GC.

NG-U: A user plane interface between an NG-RAN and a 5GC.

Proximity Services (or ProSe Service or Proximity based Service): a service that enables discovery between physically proximate devices, mutual direct communication through a base station, or communication through the third party device. Here, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a direct communication path.

ProSe Communication path: communication path supporting ProSe Communication. The ProSe E-UTRA Communication path could be established between the ProSe-enabled UEs using E-UTRA, or via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, which uses a common communication path, between more than two ProSe-enabled UEs in proximity.

ProSe UE-to-Network relay: ProSe-enabled Public Safety UE that acts as a communication relay between a ProSe-enabled UE and the ProSe-enabled network using E-UTRA.

Remote UE: This is a Prose-enabled UE connected to EPC network, i.e. perform communication with a PDN, through Prose UE-to-Network relay without service from E-UTRAN.

ProSe UE-to-UE relay: a form of relay in which a ProSe-enabled UE acts as a ProSe Communication relay between two other ProSe-enabled UEs.

ProSe-enabled Network: a network that supports ProSe Discovery, ProSe Communication and/or ProSe-assisted WLAN direct communication. Hereinafter, the ProSe-enabled network may simply be referred to as a network.

ProSe-enabled UE: a UE that supports ProSe Discovery, ProSe Communication and/or ProSe-assisted WLAN direct communication. Hereinafter, ProSe-enabled UE may simply be referred to as a UE.

Model A: involves one UE announcing "I am here". This model defines two roles for the ProSe-enabled UEs that are participating in ProSe Direct Discovery.

Announcing UE: The UE announces certain information that could be used by UEs in proximity that have permission to discover.

Monitoring UE: The UE that monitors certain information of interest in proximity of announcing UEs.

Model B: involves one UE asking "who is there" and/or "are you there". This model defines two roles for the ProSe-enabled UEs that are participating in ProSe Direct Discovery.

Discoverer UE: The UE transmits a request containing certain information about what it is interested to discover.

Discoveree UE: The UE that receives the request message can respond with some information related to the discoverer UE's request.

Proximity: proximity is determined when given proximity criteria are fulfilled.

User service description (USD): in the USD (see 3GPP TS 26.346), the application/service layer provides for each service the TMGI (Temporary Mobile Group Identity), the session start and end time, the frequencies and the MBMS service area identities (MBMS SAIs, see definition in section 15.3 of 3GPP TS 23.003) belonging to the MBMS service area (see definition in 3GPP TS 23.246).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |

TABLE 1-continued

| Reference Point | Description |
|---|---|
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
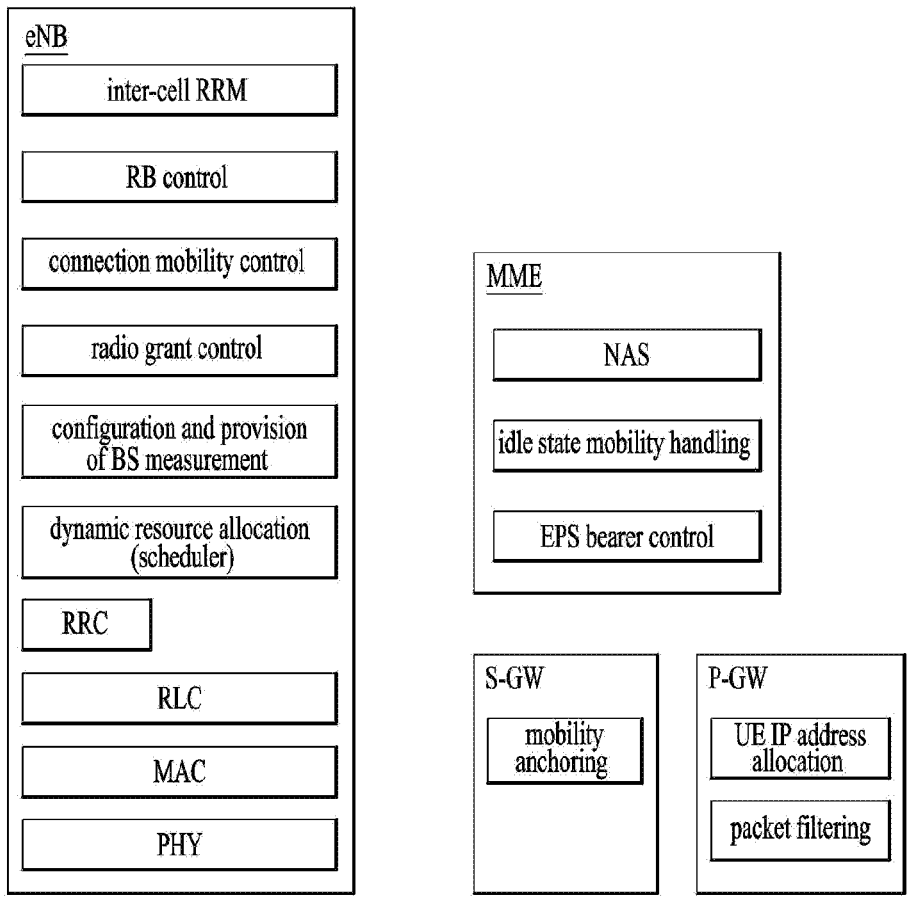
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
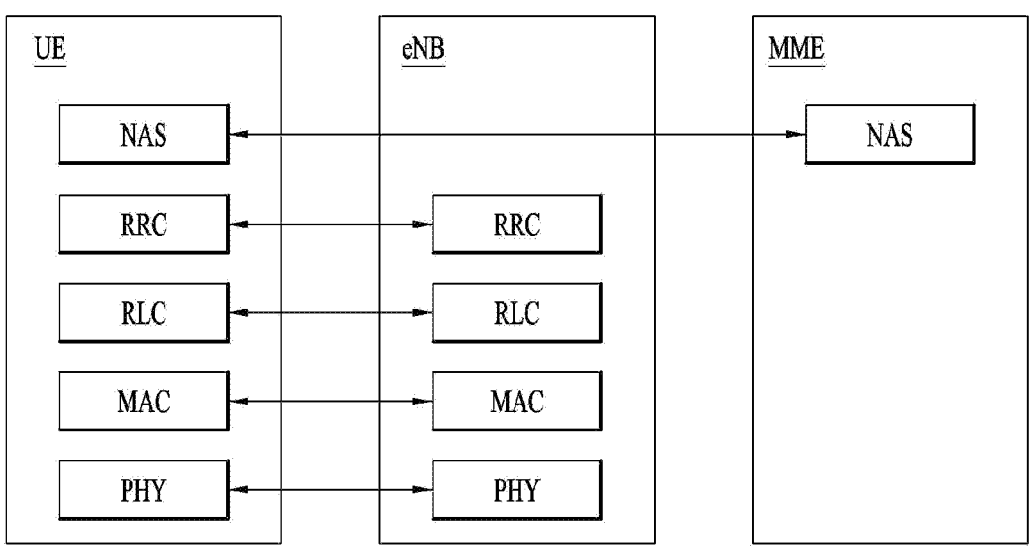
FIG. 3 is a diagram exemplarily illustrating the structure of a radio interface protocol in a control plane.
Figure 4:
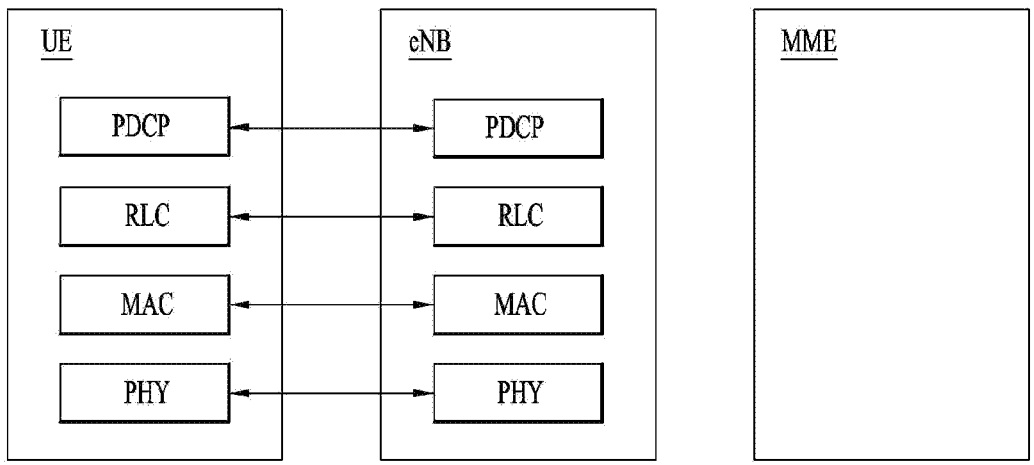
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CO- NNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish an RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (EPS Session Management) belonging to the NAS layer performs functions such as default bearer management and dedicated bearer management to control a UE to use a PS service from a network. A default bearer resource is assigned from the network during initial access to a specific Packet Data Network (PDN). In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
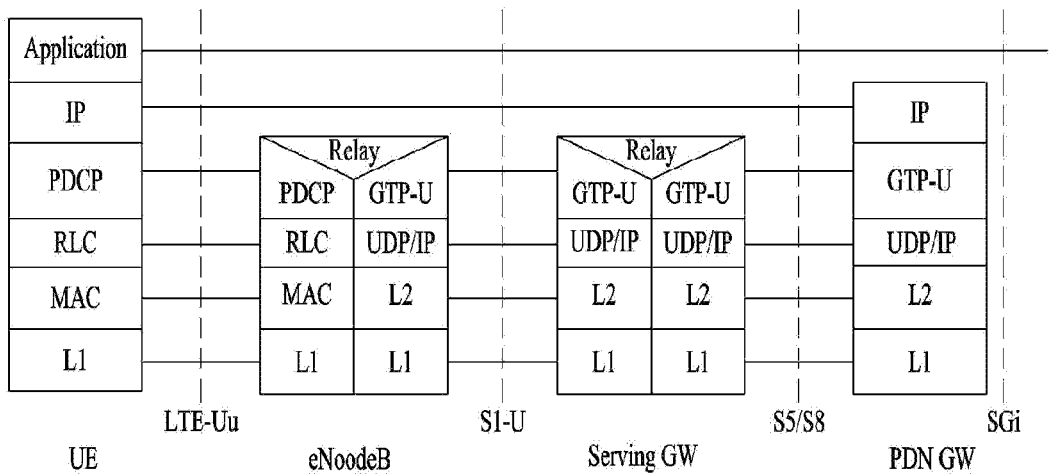
FIG. 5 is a diagram illustrating LTE (Long Term Evolution) protocol stacks for a user plane and a control plane.
Figure 5:
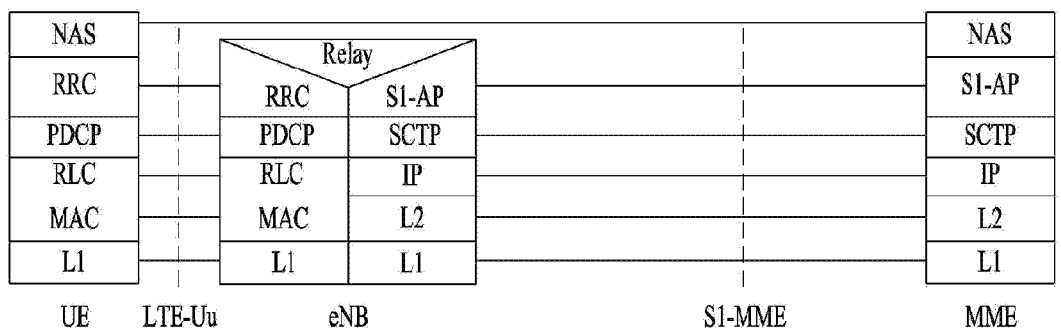

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
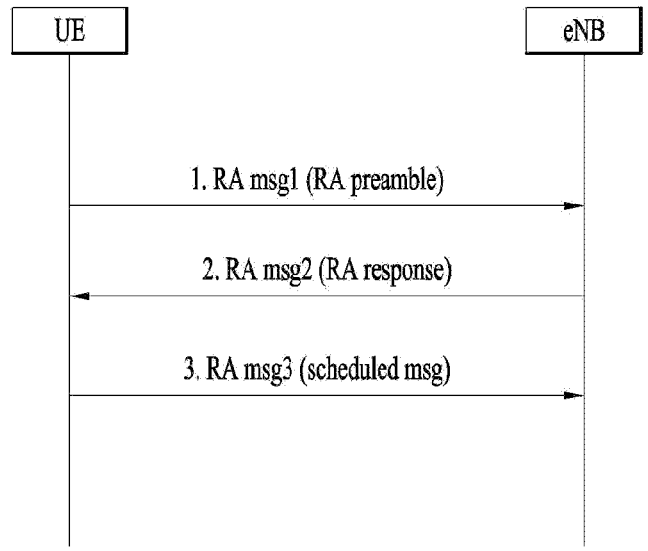
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
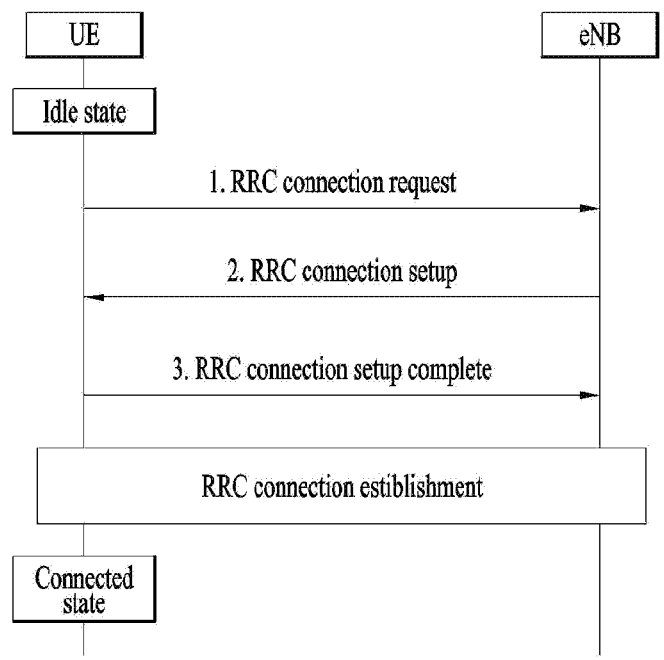
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.

2. Upon receiving the RRC connection request message from the UE, the eNB accepts the RRC connection request of the UE when the radio resources are sufficient, and then transmits an RRC connection setup message, which is a response message, to the UE.

3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

A ProSe service means a service that enables discovery and mutual direct communication between physically proximate devices or communication through a third party device.

Figure 8:
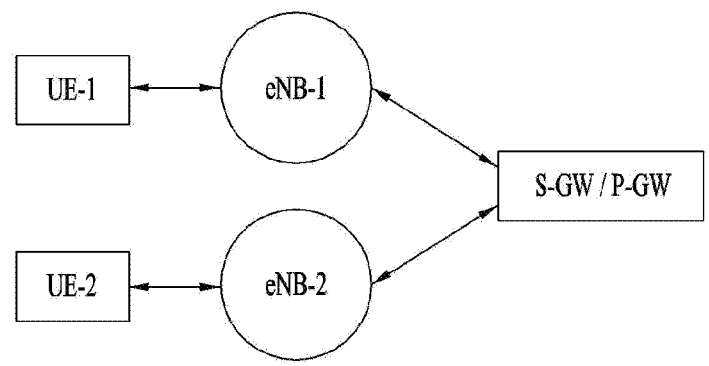
FIG. 8 illustrates a default path (that is, default data path) through which two UEs perform communication in an EPS.

FIG. 8 illustrates a default path (that is, default data path) through which two UEs perform communication in an EPS. This default path passes through an eNB and a core network (e.g., EPC), which are managed by an operator. In the present disclosure, this path will be referred to as an infrastructure data path or EPC path. Also, communication through this infrastructure data path will be referred to as infrastructure communication.

Figure 9:
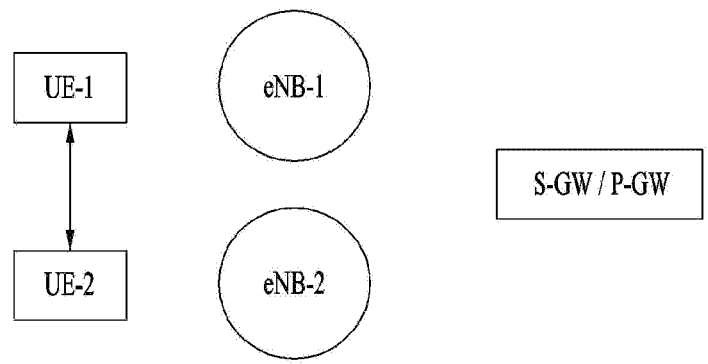
FIG. 9 illustrates a direct mode data path between two UEs based on ProSe.
Figure 9:
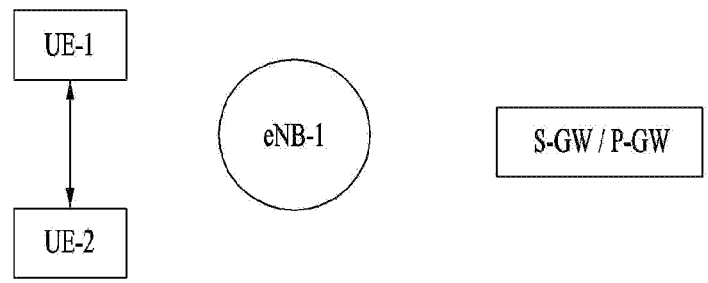

FIG. 9 illustrates a direct mode data path between two UEs based on ProSe. This direct mode data path does not pass through an eNB and a core network (e.g., EPC), which are managed by an operator. FIG. 9(a) illustrates that UE-1 and UE-2 transmit and receive data to and from each other through the direct mode data path while camping on their respective eNBs different from each other, and FIG. 9(b) illustrates that two UEs which are camping on the same eNB transmit and receive data to and from each other through the direct mode data path.

Figure 10:
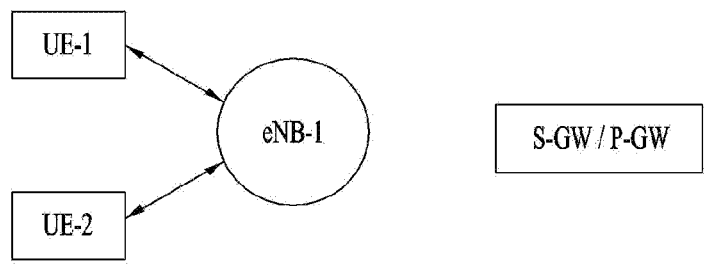
FIG. 10 illustrates a data path through eNB between two UEs based on ProSe, especially a locally-routed data path.

FIG. 10 illustrates a data path through eNB between two UEs based on ProSe, especially a locally-routed data path. This data path through eNB does not pass through a core network (e.g., EPC) managed by an operator.

In the present disclosure, the data path described in FIGS. 9 and 10 will be referred to as a direct data path, a data path for proximity service, or a proximity service based data path or proximity service communication path. Also, the direct data communication will be referred to as direct communication or proximity service communication or proximity service based communication.

Figure 11:
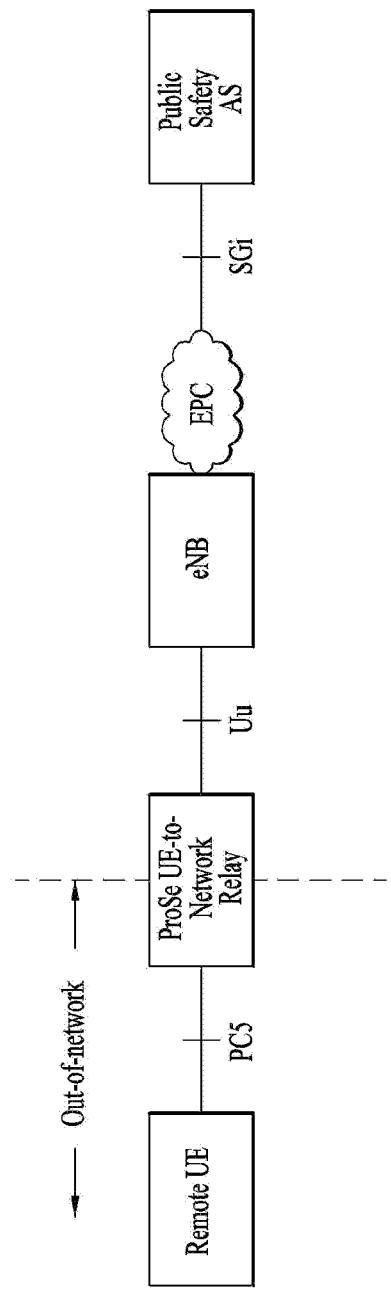
FIG. 11 illustrates communication through a ProSe UE-to-Network relay.

FIG. 11 illustrates communication through a ProSe UE-to-Network relay. A remote UE may perform communication with an application server (AS) or take part in group communication by receiving connectivity to an EPC through a UE-to-Network relay. As a result, a UE (e.g., remote UE of FIG. 11) which is out of network coverage (which is not served by E-UTRAN) may receive a connection service to a network through a ProSe UE-Network relay. In addition, if a UE which is inside network coverage uses a ProSe UE-to-Network relay, since the UE may perform communication by using only a power to reach a relay close thereto rather than an eNB which is distant, battery saving may be achieved. A UE that is operable as the ProSe UE-to-Network Relay UE may access the network to provide relay traffic to the remote UE. In the present disclosure, the remote UE refers to a UE that is not served by a wireless communication network (e.g., an E-UTRAN, NextGen, etc.) through direct wireless connection and is connected to the network through the UE-to-Network Relay. The ProSe UE-to-Network Relay UE (hereinafter, a relay UE) refers to a UE that transfers, between the network using wireless communication technologies (e.g., E-UTRAN, new RAT (i.e., NR), etc.) and the remote UE, information/data that should be transmitted/received between the remote UE and the network. In a radio interface, ProSe communication is implemented through sidelink communication. In the present disclosure, ProSe communication may be implemented using an LTE-based PC5 interface or NR-based equivalent technology. The PC5 interface is a reference point between ProSe-enabled UEs used for control and user planes, for ProSe direct discovery, ProSe direct communication, and ProSe UE-to-Network Relay (see 3GPP TS 23.303). Lower protocol layers of the PC5 reference point may be based on E-UTRA sidelink capabilities or WLAN technology, specified in 3GPP TS 36.300. The PC5 interface may be used between the remote UE and the relay UE and a Uu interface, which is also used for normal UE-to-Network communication, may be used between the relay UE and a network node (e.g., eNB). If discovery and discovery announcement are made between UEs through PC5-S, which is a higher layer than a radio resource control (RRC) layer, the UEs are linked. PC5-S means a PC5 signaling protocol. The PC5-S protocol is used for control plane signaling over PC5 (e.g., establishment, maintenance, and release of a secure layer-2 link over PC5, temporary mobile group identity (TMGI) monitoring requests, cell ID announcement requests, etc.) (see 3GPP TS 23.303). If PC5 connection is established between the UEs so that the UEs are linked, radio resource configuration for sidelink communication between the UEs is performed based on system information (e.g., a system information block (SIB)), RRC signaling, and prestored configuration information. The UEs perform sidelink transmission/reception (e.g., transmission/reception of sidelink control information and related data) using resources in the radio resource configuration in a physical layer.

3GPP TR 23.713 V1.2.0 proposes a method in which a UE discovers a ProSe UE-network relay. For example, a procedure in which the UE directly discovers the ProSe UE-to-Network Relay for public safety use may be as follows. Both Model A that uses a single discovery protocol message (announcement) and Model B that uses two discovery protocol messages (solicitation and response) are supported. The following use cases for public safety discovery are supported: UE-to-Network Relay discovery; determination is needed as to which user(s) are in a ProSe communication range at any given time with regard to ProSe communication; and/or UE-to-UE Relay discovery. The following parameters are common to all of UE-to-Network Relay discovery, group member discovery, and UE-to-UE Relay discovery:

message type: announcement (Model A) or solicitation/response (Model B), discovery type: indicates whether this is UE-to-Network Relay discovery, group member discovery, or UE-to-UE Relay discovery.

The following parameters are used for UE-to-Network Relay discovery:

ProSe relay UE ID: link layer identifier that is used for direct communication and is associated with a PDN connection that a ProSe UE-to-Network Relay has established;

announcer/discoverer information: provides information about an announcing or discoverer user;

discoveree information (Model B): provides information about a discoveree;

PLMN ID;

connectivity information: for Model A, a parameter (e.g., including APN information) identifying connectivity that a ProSe UE-to-Network Relay provides. For Model B, information about connectivity that a discoverer UE is interested in;

status/maintenance flags (e.g. indicating whether a relay is temporarily without connectivity or battery is running low so that remote UEs can seek/reselect another relay);

group information: contains information about group(s) that a UE-to-Network Relay is currently relaying (Model A) or group(s) for which a remote UE is seeking a UE-to-Network Relay (Model B);

ProSe UE ID: link layer identifier of a discoverer that is used for direct communication (Model B); and/or radio layer information: contains radio layer information, e.g. information about radio conditions between an eNB and a UE-to-Network Relay, to assist the remote UE in selecting a proper UE-to-Network Relay.

The following parameters are used for group member discovery:

ProSe UE ID: link layer identifier that is used for direct communication;

announcer/discoverer information: provides information about an announcing or discoverer user;

discoveree information (Model B): provides information about a discoveree; and/or target information (Model B): provides information about targeted discoverees (single user or group).

The following parameters are used for UE-to-UE Relay discovery:

ProSe UE ID: link layer identifiers of a discoverer and a discoveree that are used for direct communication (Model B);

announcer/discoverer information: provides information about an announcing or discoverer user;

remote user information: provides information about a user of a remote UE; and/or discoveree information (Model B): provides information about a discoveree.

In ProSe-to-network relay communication, for communication between a remote UE and a core network, a relay UE is always involved regardless of control plane signaling or user plane data. When the remote UE transitions from an idle mode to a connected mode, it may be assumed that the relay UE is already in the connected mode. Otherwise, the remote UE may not exchange messages with a core network. When the relay UE is already in the connected mode due to activity thereof or other remote UEs, there is no need for the relay UE to monitor a paging channel because an eNB may send any message to the relay UE anytime. Then, to notify terminating traffic for the remote UE in the idle mode, a conventional paging procedure may not be used because an associated relay UE does not monitor a paging channel over Uu. When the relay UE is in the idle mode, which paging occasion (PO) should be monitored by the relay UE is problematic. If the relay UE additionally monitors a PO of the remote UE as well as a PO thereof, additional information to calculate a PO should be delivered to the relay UE. Furthermore, if the relay UE serves several remote UEs, then the number of POs to monitor also increases, thereby resulting in battery consumption of the relay UE. Accordingly, notification of downlink (DL) data arrival for the remote UE requires an approach different from a normal paging procedure. Therefore, a method is proposed of efficiently delivering a terminating call/traffic for a remote UE through a relay UE while minimizing battery consumption of the relay UE to the remote UE connected to the relay UE. Particularly, the present disclosure proposes a method in which a network delivers paging to the remote UE connected to the relay UE through the relay UE while minimizing battery consumption of the relay UE.

Prior to a detailed description of the present disclosure, paging of an LTE/LTE-A system will now be described in order to aid in understanding paging. In a 3GPP based communication system, discontinuous reception (DRX) is used for power saving of the UE and efficient resource use. Hereinafter, DRX in an IDLE mode will be described with reference to 3GPP TS 36.304. The UE may use DRX in the IDLE mode in order to reduce power consumption. UEs in the IDLE mode monitor a PDCCH for a paging radio network temporary identifier (P-RNTI) used for paging (hereinafter, a P-RNTI PDCCH) to receive a paging message from an eNB. The UEs need to monitor the P-RNTI PDCCH only in a UE-specific paging occasion, i.e., in a specific subframe in a specific radio frame. The paging occasion is a specific time unit (e.g., a subframe) in which the P-RNTI PDCCH is monitored and a paging DRX cycle is a time interval in which such a paging signal is transmittable. A UE in an idle mode monitors paging on a specific paging occasion of every UE-specific paging DRX cycle. The paging message is transmitted to all cell(s) belonging to the same tracking area (TA). If a UE moves from one TA to another TA, the UE sends a tracking update message to a network so that the location thereof may be updated by the network in order to prevent the network from transmitting the paging message to an unnecessary area. One paging occasion (PO) is a subframe in which there may be a P-RNTI transmitted on a PDCCH, an MTC PDCCH (MPDCCH), or, for narrowband IoT (NB-IoT), on a narrowband PDCCH (NPDCCH), that addresses a paging message. For the P-RNTI transmitted on the MPDCCH, PO refers to the starting subframe of MPDCCH repetitions. For the P-RNTI transmitted on the NPDCCH, PO refers to the starting subframe of NPDCCH repetitions unless a subframe determined by PO is not a valid NB-IoT DL subframe. If the subframe determined by PO is an invalid NB-IoT DL subframe, the first valid NB-IoT DL subframe after PO is the starting subframe of the NPDCCH repetitions. One paging frame (PF) is one radio frame which may include one or multiple POs. When DRX is used, the UE needs only to monitor one PO per DRX cycle. One paging narrowband (PNB) is one narrowband on which the UE performs paging message reception. PF, PO, and PNB are determined by the following equations using DRX parameters provided in system information. For example, an information element (IE) RadioResourceConfigCommonSIB used to specify common radio resource configuration in system information (e.g., system information block type 2 (SIB2)) may include configuration information regarding a paging channel (PCCH) and the configuration information regarding the PCCH may include a paging cycle used to derive a DRX cycle T of the UE. PF is given by the following equation: SFN mod T=(T div N)*(UE_ID mod N). An index $i\_s$ which points PO from a subframe pattern defined in Table 2, Table 3, Table 4, or Table 5 shown below is derived by the following calculation: $i\_s$=floor(UE_ID/N) mod Ns. If the P-RNTI is monitored on the MPDCCH, PNB is determined by the following equation: PNB=floor(UE_ID/(N*Ns)) mod Nn. For FDD, if the P-RNTI is transmitted on the PDCCH or the NPDCCH, or if the P-RNTI is received on the MPDCCH with a system bandwidth>3 MHz, the subframe pattern of Table 2 is used. For FDD, if the P-RNTI is transmitted on the MPDCCH with system bandwidths of 1.4 MHz and 3 MHz, the subframe pattern of Table 3 is used. For TDD (all UL/DL configurations), if the P-RNTI is transmitted on the PDCCH or the NPDCCH, or if the P-RNTI is received on the MPDCCH with a system bandwidth>3 MHz, the subframe pattern of Table 4 is used. For TDD (all UL/DL configurations), if the P-RNTI is transmitted on the MPDCCH with system bandwidths of 1.4 MHz and 3 MHz, the subframe pattern of Table 5 is used.

TABLE 2

| Ns | PO when $i\_s = 0$ | PO when $i\_s = 1$ | PO when $i\_s = 2$ | PO when $i\_s = 3$ |
|---|---|---|---|---|
| 1 | 9 | N/A | N/A | N/A |
| 2 | 4 | 9 | N/A | N/A |
| 4 | 0 | 4 | 5 | 9 |

TABLE 3

| Ns | PO when $i\_s = 0$ | PO when $i\_s = 1$ | PO when $i\_s = 2$ | PO when $i\_s = 3$ |
|---|---|---|---|---|
| 1 | 5 | N/A | N/A | N/A |
| 2 | 5 | 5 | N/A | N/A |
| 4 | 5 | 5 | 5 | 5 |

TABLE 4

| Ns | PO when $i\_s = 0$ | PO when $i\_s = 1$ | PO when $i\_s = 2$ | PO when $i\_s = 3$ |
|---|---|---|---|---|
| 1 | 0 | N/A | N/A | N/A |
| 2 | 0 | 5 | N/A | N/A |
| 4 | 0 | 1 | 5 | 6 |

TABLE 5

| Ns | PO when $i\_s = 0$ | PO when $i\_s = 1$ | PO when $i\_s = 2$ | PO when $i\_s = 3$ |
|---|---|---|---|---|
| 1 | 1 | N/A | N/A | N/A |
| 2 | 1 | 6 | N/A | N/A |
| 4 | 1 | 1 | 6 | 6 |

System Information DRX parameters stored in the UE shall be updated locally in the UE whenever the DRX parameter values are changed in system information (SI). If the UE has no international mobile subscriber identity (IMSI), for instance when making an emergency call without USIM, the UE shall use as default identity UE_ID=0 in the PF, $i\_s$, and PNB formulas above. The following Parameters are used for the calculation of the PF, $i\_s$, and PNB.

T: DRX cycle of the UE. Except for NB-IoT, if a UE specific extended DRX value of 512 radio frames is configured by upper layers according to section 7.3 of 3GPP TS 36.304, T=512. Otherwise, T is determined by the shortest of the UE specific DRX value, if allocated by upper layers, and a default DRX value broadcast in system information. If UE specific DRX is not configured by upper layers, the default value is applied. UE specific DRX is not applicable for NB-IoT.

nB: 4T, 2T, T, T/2, T/4, T/8, T/16, T/32, T/64, T/128, and T/256, and for NB-IoT also T/512, and T/1024.

N: min(T,nB).

Ns: max(1,nB/T).

Nn: number of paging narrowbands provided in system information.

UE_ID: IMSI mod 1024, if P-RNTI is monitored on PDCCH; P IMSI mod 4096, if P-RNTI is monitored on NPDCCH; IMSI mod 16384, if P-RNTI is monitored on MPDCCH. IMSI≠ IMSI is given as sequence of digits of type Integer (0.9), IMSI shall in the formulae above be interpreted as a decimal integer number, where the first digit given in the sequence represents the highest order digit. For example: IMSI=12 (digit1=1, digit2=2). In the calculations, this shall be interpreted as the decimal integer "12", not "1×16+2=18".

A UE in IDLE mode may be configured by upper layers with an extended DRX (eDRX) cycle $T_{eDRX}$. The UE may operate in extended DRX only if the cell indicates support for eDRX in System Information. If the UE is configured with a $T_{eDRX}$ cycle of 512 radio frames, it monitors POs with parameter T=512. Otherwise, a UE configured with eDRX monitors POs based on the upper layer configured DRX value and a default DRX value, during a periodic Paging Time Window (PTW) configured for the UE or until a paging message including the UE's NAS identity is received for the UE during the PTW. The PTW is UE-specific and is determined by a Paging Hyperframe (PH), a starting position within the PH (PTW_start) and an ending position (PTW_end). PH, PTW_start and PTW_end are given by the following formulae: H-SFN mod $T_{eDRX,H}$=(UE_ID_H mod $T_{eDRX,H}$), where UE_ID_H is 10 most significant bits of the Hashed ID, if P-PRNTI is monitored on PDCCH or MPDCCH, or 12 most significant bits of the Hashed ID, if P-RNTI is monitored on NPDCCH; IMSI mode 1024; $T_{eDRx,H}$ is eDRX cycle of the UE in hyper-frames ($T_{eDRX,H}$=1, 2, . . . , 256 Hyper-frames) (for NB-IoT, $T_{eDRX,H}$=2, . . . , 1024 hyper-frames) and configured by upper layers. PTW_start denotes the first radio frame of the PH that is part the PTW and has SFN satisfying the following equation: SFN=256*$i_{eDRX}$, where $i_{eDRX}$=floor (UE_ID_H/$T_{eDRX,H}$) mod 4. PTW_end is the last radio frame of the PTW and has SFN satisfying the following equation: SFN=(PTW_start+L*100−1) mod 1024, where L=Paging Time Window length (in seconds) configured by upper layers. Hashed ID is defined as follows: Hashed_ID is the Cyclic Redundancy Check value of $b_{31}$, $b_{30}$ . . . , $b_0$ of S-TMSI, computed according to CRC-32 algorithm in ITU-T Recommendation V.42 (03/2002) "Error-correcting procedures for DCEs using asynchronous-to-synchronous conversion", and S-TMSI=<b39, b38, . . . , b0> as defined in 3GPP TS 23.003.

Figure 12:
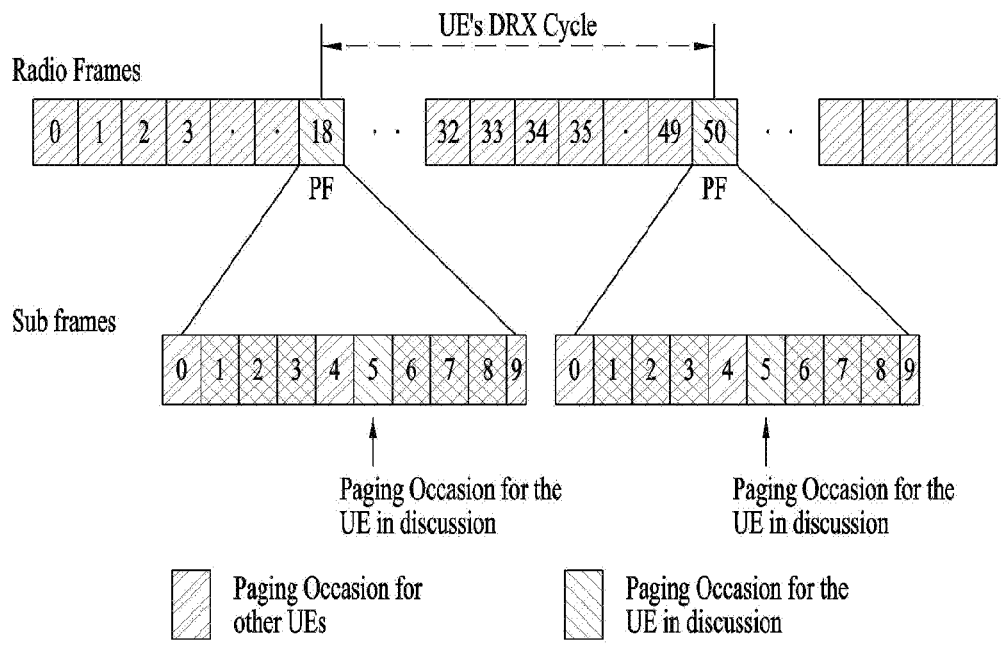
FIG. 12 illustrates POs used in an LTE system.

FIG. 12 illustrates POs used in an LTE system. Particularly, FIG. 12 illustrates POs when a DRX cycle (i.e., a paging DRX cycle) of a UE is 32 (i.e., T=32), a paging cycle, i.e., the number of POs in the DRX cycle for all users in a cell, is 4T (i.e., Bn=4T), and UE_ID is 722. In FIG. 12, all radio frames are PFs. 4 subframes (Ns=4) per PF are used for paging in the paging DRX cycle. Among subframes 0, 4, 5, and 9 used for paging in a PF according to a subframe pattern which is predefined for Ns=4 in FDD, a PO for the UE is subframe 5. 32 PFs and 128 POs (nB=128) are available in the DRX cycle of the UE. UEs are distributed across the DRX cycle based on UE identities (IDs).

Hereinafter, delivery of terminating data for a remote UE according to the present disclosure will be described. The present disclosure assumes a situation in which, when direct communication connection (e.g., PC5 connection) is established between the remote UE and a relay UE, the remote UE performs communication with a network via the relay UE.

In the present disclosure, the relay UE monitors a paging channel using an ID thereof based on a UE ID thereof (e.g., an international mobile subscriber identity (IMSI) or an SAE-temporary mobile subscriber identity (S-TMSI)) on a PO thereof (e.g., using the S-TMSI if the UE has a valid S-TMSI and using the IMSI if the UE does not have the valid S-TMSI). Additional PO monitoring based on an ID (e.g., an IMSI or an S-TMSI) of another remote UE is not required by the relay UE. In other words, according to the present disclosure described in detail hereinbelow, the relay UE only needs to monitor a PO based on a UE ID thereof and need not monitor a PO based on an ID of each remote UE. Therefore, since it is not necessary to additionally monitor POs other than a PO of the relay UE in order to monitor paging of remote UE(s) linked to the relay UE, battery consumption of the relay UE may be reduced.

Figure 13:
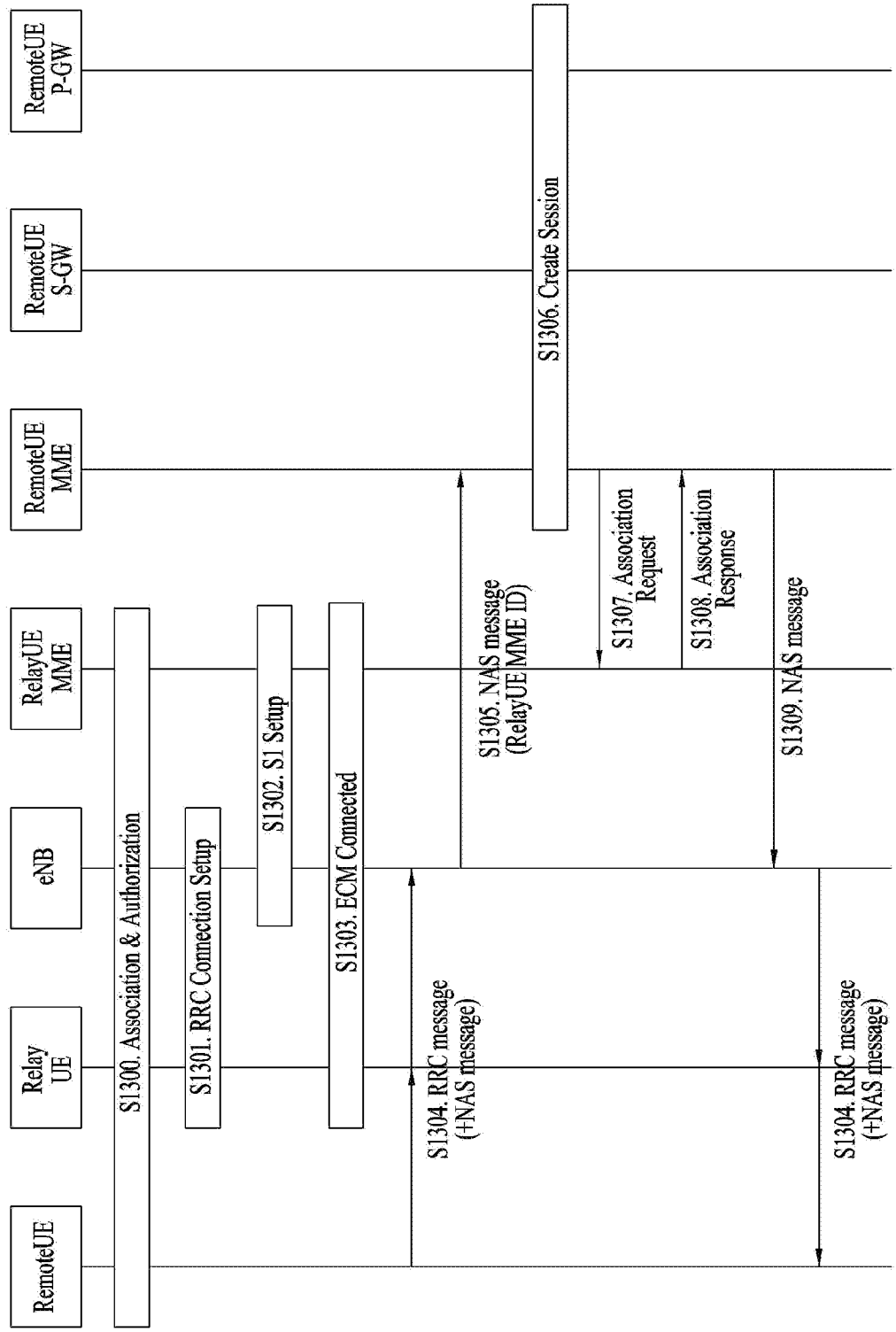
FIG. 13 illustrates a method in which a context for a remote UE or a relay UE is established in a core network (e.g., between MMEs).

FIG. 13 illustrates a method in which a context for a remote UE or a relay UE is established in a core network (e.g., between MMEs). That is, FIG. 13 illustrates an association establishment procedure between the remote UE, the relay UE and the core network.

S1300. The remote UE discovers the relay UE and establishes connection (e.g., PC5 connection) for one-to-one communication between the relay UE and the remote UE. The remote UE may be authorized by the network to use the discovered relay UE. In this step, the remote UE and the relay UE may exchange information about their IDs and information about MME IDs of MMEs that serve the remote UE and the relay UE.

S1301. After authorization is completed, the remote UE needs to be registered in the network. For signaling between the remote UE and the network, the relay UE establishes RRC connection toward an eNB. The relay UE may include a UE ID thereof and information about an MME thereof in an RRC message for RRC connection establishment (e.g., an RRC Connection Setup Request message) to transmit the same to the eNB.

Optionally, in this step, the relay UE may provide information about an ID of the remote UE served thereby to the network. In this case, in S1304, the context for the remote UE will be generated faster with respect to the eNB. Alternatively, upon receiving RRC connection requests from many UEs, the eNB may preferentially establish RRC connection with the relay UE over connection requests by other UEs, based on this information.

S1302. The eNB establishes an S1 link with the MME of the relay UE for relaying, based on the request by the relay UE.

S1303. The relay UE moves to an ECM-CONNECTED mode.

S1304. The remote UE starts to perform a registration procedure. NAS messages (e.g., an attach request, a tracking area update (TAU) request) sent by the remote UE is transported to the eNB through an RRC message. The eNB may set up an additional context for the remote UE. In this step, the remote UE may include an ID of a relay UE associated therewith in a message transmitted thereby to the network. In this step, the eNB may be aware of the MME of the remote UE.

S1305. The NAS messages from the remote UE are delivered to the MME of the remote UE. In this S1-AP procedure, the eNB additionally delivers information about the MME that serves the associated relay UE to the MME of the remote UE.

S1306. The MME of the remote UE starts to perform a create session procedure. For example, the MME of the remote UE creates a session for the remote UE and builds the context for the remote UE using the information delivered from the eNB.

S1307. After successfully creating the session for the remote UE, the MME of the remote UE sends Association Requests to the MME of the relay UE based on the information delivered from the eNB. This step is used to request association between the MME that serves the remote UE, the MME that serves the relay UE, the remote UE, and the relay UE. In other words, the MME of the remote UE may be aware of the MME of the relay UE based on the information delivered from the eNB and provides information about the remote UE, information about the associated relay UE, and/or information thereabout (e.g., information about the MME of the remote UE) to the MME of the relay UE.

S1308. The MME of the relay UE keeps information regarding the remote UE (e.g., information about the MME of the remote UE MME) and replies with an Association Response to confirm successful association between the MMEs.

S1309. The MME of the remote UE generates a NAS message (e.g., Attach Accept) and the NAS message is transported to the eNB via an S1-AP. In this step, the MME of the remote UE may request that the eNB create the context for the remote UE.

Optionally, the eNB may inform the MME that serves a relay UE associated with the remote UE of information regarding the remote UE that the relay UE serves. Then, the MME of the relay UE may add information regarding the remote UE to context information related to the relay UE. Particularly, the eNB may additionally inform the MME of the relay UE of information about the MME that serves the remote UE and this information of the relay UE may be managed in the context.

S1310. The eNB transmits the NAS message to the remote UE via the relay UE over an RRC message.

According to the present disclosure, in FIG. 13, the eNB may provide information about the MME that serves the relay UE associated with the remote UE, i.e., information about the MME of the relay UE, to the MME of the remote UE in S1305. Therefore, when the remote UE is linked with the relay UE, there is an advantage that a separate message carrying information for assisting paging for the remote UE need not be introduced or defined. In addition, the eNB may provide an MME of one UE with information about an MME of another UE linked to the UE without delay on the earliest occasion when the eNB may provide information about association between the MME of the remote UE and the MME of the relay UE.

Figure 14:
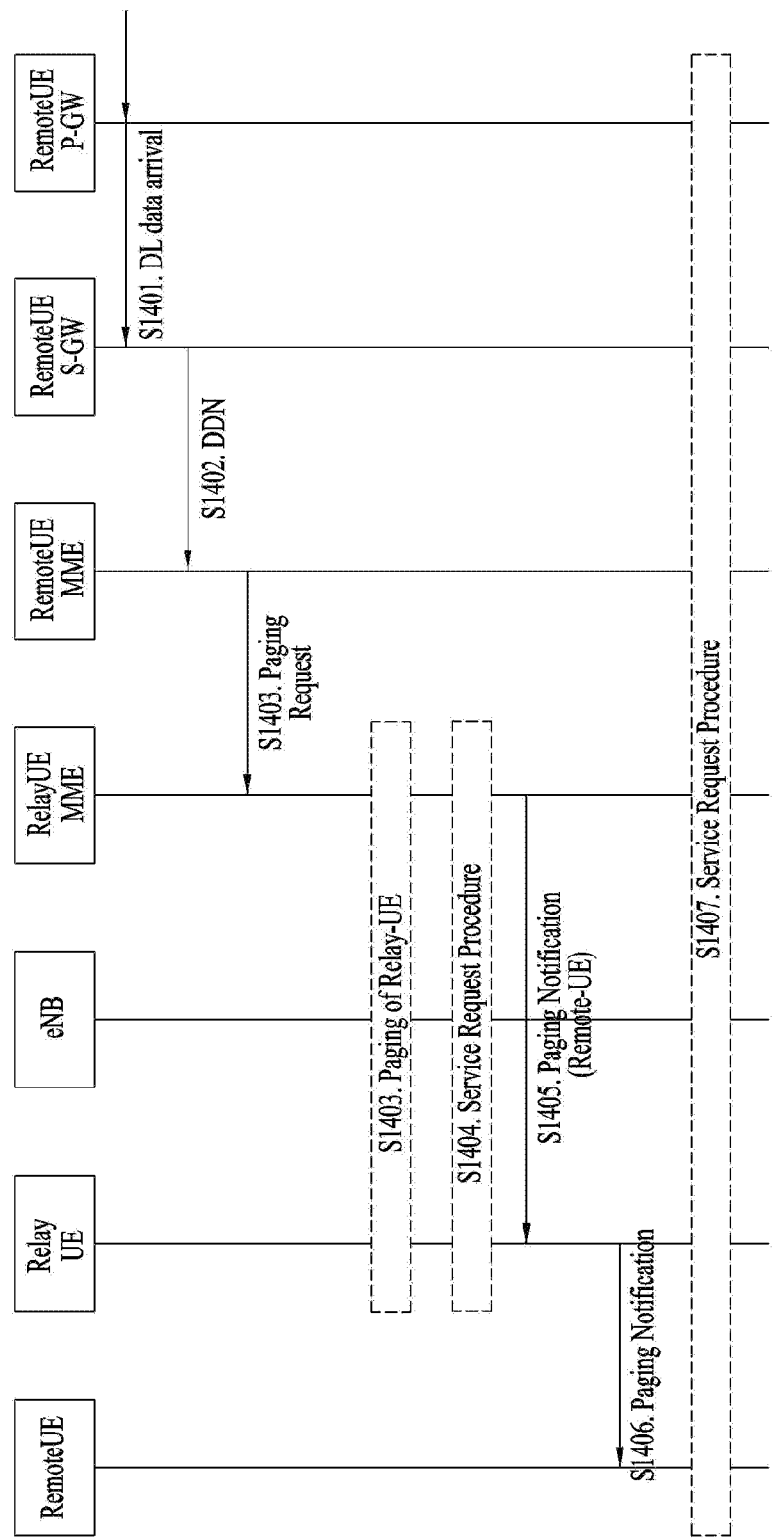
FIG. 14 illustrates how downlink data transfer for a remote UE is delivered via a relay UE.

After association is established in the core network, the remote UE may enter an RRC_IDLE mode. FIG. 14 illustrates how DL data transfer for a remote UE is delivered via a relay UE.

S1400. DL data arrives at an S-GW of the remote UE.

S1401. The S-GW of the remote UE sends a Downlink Data Notification message to an MME of the remote UE.

S1402. Based on information about an MME of an associated relay UE, an MME of the remote UE sends a Paging Request message to the MME of the relay UE. In this step, the MME of the remote UE uses an ID of the relay UE that serves the remote UE and information regarding a related MME, that have been managed in a context thereof. The Remote Paging Request message may include information about the relay UE, the remote UE, and the MME of the remote UE.

For example, the MME of the remote UE checks whether the remote UE accesses a network in an indirect mode, i.e., whether the remote UE accesses the network via the relay UE, based on previously stored information. If the remote UE is in the indirect mode, the MME of the remote UE confirms information about the MME of the relay UE to which the remote UE is connected. Then, the MME of the remote UE may send information about the remote UE to the MME of the relay UE to request paging for the remote UE. The MME of the remote UE additionally sends information about the relay UE associated with the remote UE to cause the MME of the relay UE to perform paging. If the remote UE is in a direct mode, i.e., if the remote UE is directly connected to the network without passing through the relay UE, the MME of the remote UE transmits paging to the eNB.

S1403. After receiving the Remote Paging Request message from the MME of the remote UE, the MME of the relay UE starts to perform a paging procedure to bring the associated relay UE to a connected mode if the relay UE is not in the connected mode. The eNB starts to perform a paging procedure for the relay UE by transmitting a paging message on a PO of the relay UE.

The MME of the relay UE may inform eNB(s) that corresponding paging is caused by traffic corresponding to the remote UE which is served by the relay UE through a Paging Request message transmitted to the eNB(s). Then, the paging message transmitted by the eNB to the relay UE over Uu may include information indicating that corresponding paging is caused by DL traffic generated for the remote UE that the relay UE serves. Paging information transmitted from the MME to the eNB or from the eNB to the UE may include an ID of an associated remote UE. Then, the relay UE may perform an operation of waking up the remote UE from DRX. Alternatively, the relay UE may directly inform the remote UE that paging has arrived.

S1404. As a response to received paging, the relay UE starts to perform a Service Request Procedure.

Upon receiving information indicating that paging received by the relay UE is paging caused by the remote UE, the relay UE may transmit, over a corresponding message, information indicating that paging of the remote UE is supported or information having meaning similar to the above information as a cause value, upon transmitting an RRC Connection Request message to the eNB or upon transmitting a Service Request message to the MME of the relay UE. Using the RRC Connection Request message or the Service Request message including the above information, the MME of the relay UE may omit setup of a user plane with respect to the service request of the relay UE.

After connection with the relay UE is established, the MME of the relay UE may inform the MME of the remote UE that the relay UE associated with the remote UE has entered a connected mode. In this case, the MME of the relay UE may also inform the MME of the remote UE of information about a cell and eNB in which the relay UE is located. Then, the MME of the remote UE may directly request that the eNB page the remote UE.

S1405. After signaling connection is established toward the relay UE, the MME of the relay UE sends a Remote Data Notification message (or also called Paging Notification) to the relay UE together with an ID of the remote UE. The Remote Data Notification message requests that the relay UE inform the remote UE of paging. In other words, if the relay UE enters the connected mode, the MME of the relay UE transmits a NAS message to the relay UE and the NAS message may indicate that there is paging for the remote UE connected to the relay UE or there is termination data for the remote UE.

If the relay UE is in the connected mode, the MME of the relay UE may send the Remote Data Notification message at any time even not on a PO. A UE of the connected mode does not wake up only on a PO to monitor a DL signal and will monitor the DL signal in a normal DL time duration unless the normal time duration is a DRX duration specially configured for the connection mode.

If the relay UE has already been in the connected mode for some reasons, S1403 and S1404 which are operations for transitioning the relay UE to the connected mode are omitted and S1405 may be performed. That is, if the MME of the relay UE has already been in the connected mode when the MME of the relay UE should transmit a paging message for the remote UE, since the relay UE need not transition to the connected mode, the MME of the relay UE may inform the relay UE at any time of the fact that there is paging for the remote UE through connection between the MME of the relay UE and the eNB and RRC connection between the eNB and the relay UE.

S1406. The relay UE informs the remote UE of paging. Based on information received in S1405, the relay UE may be aware that paging should be transmitted to the remote UE. In other words, based on information received in S1406, the relay UE may be aware that there is terminating data for the remote UE and the relay UE transmits a Paging Notification message to the remote UE or pages the remote UE.

S1407. The remote UE starts to perform a Service Request procedure.

According to the present disclosure, since the MME of the remote UE may be aware of the MME of the relay UE to which the remote UE is linked, when paging for the remote UE is needed, the MME of the remote UE may request the MME of the relay UE to page the remote UE. The MME of the relay UE performs paging of the remote UE on a PO of the relay UE. Then, the relay UE may perform monitoring only on a PO of the relay UE for paging reception for the remote UE linked thereto and need not separately monitor a PO of the remote UE. Accordingly, even if there is paging for the remote UE in a state in which the remote UE accesses the network through the relay UE, battery consumption of the relay UE may be prevented.

As another method, after S1404, the MME of the relay UE may inform the MME of the remote UE that signaling connection has been established with the relay UE and additionally inform the MME of the remote UE of information about an eNB of the relay UE. Then, the MME of the remote UE may directly send S1 signaling to the eNB to request the eNB to establish RRC connection with the remote UE.

In this step, for data transmission of the remote UE, the relay UE transitions to an ECM-CONNECTED mode. According to the prior art, while the relay UE transitions to the ECM-CONNECTED mode, an EPS bearer allocated to the relay UE is set up again. Herein, the reason why the relay UE transitions to the CONNECTED mode is occurrence of data for the remote UE to which the relay UE provides a service, rather than data of the relay UE. Therefore, for data transmission of the remote UE, if the relay UE sets up all EPS bearers associated therewith and releases all the setup EPS bearers upon transitioning to an idle mode after data transmission of the remote UE is ended, unnecessary signaling is generated and unnecessary resources should be allocated even to a core network. Therefore, the present disclosure proposes informing the MME of the relay UE that a service request procedure has additionally been generated due to traffic transmission of the remote UE when the relay UE performs the service request procedure due to traffic of the remote UE. Then, the MME of the relay UE may optionally perform a Modify/Create Session operation using an S-GW/P-GW/eNB. For example, when the relay UE transmits a Service Request message for the purpose of transmitting traffic of the remote UE or supporting a relaying operation, the MME of the relay UE omits an EPS bearer setup operation of the relay UE, e.g., Modify Bearer Request transmission to an S-GW or information related to bearer setup of the relay UE from S1-AP: Initial Context Setup Request message. In addition, for example, when the relay UE transmits a Serving Request message for data transmission/reception thereof, the MME of the relay UE performs an EPS bearer setup operation of the relay UE. For example, if the relay UE transmits the Service Request message for data transmission/reception thereof, the MME of the relay UE performs Modify Bearer Request transmission to the S-GW or includes the information related to bearer setup of the relay UE in S1-AP: Initial Context Setup Request message. To this end, in the Service Request message, a cause value may be extended to additionally include information indicating a relay operation, mobile originating (MO) data of the remote UE, or terminating data of the remote UE.

Herein, although the service request procedure is performed for the remote UE at the beginning, data may be generated from the relay UE after a predetermined time elapses. In this case, an EPS bearer for the relay UE should be immediately set up. To support this operation, the relay UE performs a service request for the remote UE to transition to an ECM-CONNECTED mode and, if there is data generated by the relay UE in a state in which an EPS bearer set up actively for mode for the relay UE is not present, the relay UE may additionally perform a service request in order to indicate that there is data to be transmitted. That is, the relay UE may transmit a service request, a cause value of which is MO-data, to the MME.

Alternatively, if the relay UE performs a service request procedure in order to support data transmission/reception of the remote UE, traffic for the relay UE may not be generated. Particularly, if an S-GW which is in charge of an EPS bearer for the relay UE is different from an S-GW which is in charge of an EPS bearer for the remote UE, the S-GW which is in charge of the relay UE may have no UL and DL traffic flows. In this case, the MME of the relay UE may determine that there is no traffic of the relay UE and decide to disconnect signaling connection from the relay UE. Then, the relay UE is disconnected and at the same time, the network is disconnected from the remote UE so that the quality of service of the remote UE which is performing data transmission/reception is deteriorated. In order to solve this problem, the present disclosure includes, in a service request, information indicating that, when the relay UE transmits the service request to the network in the case in which the relay UE serves the remote UE, the network should continuously maintain signaling connection even after a service request procedure. If the information is present in a Service Request message, the network is not disconnected from the relay UE even if the service request procedure is ended. If the information is not present in the Service Request message, the network may be disconnected from the relay UE as needed when the service request procedure is ended.

In some cases, the remote UE is in idle mode but the relay UE may have already entered a connected mode due to traffic thereof or for other reasons. In this case, the MME of the relay UE may inform the MME of the remote UE that the relay UE has entered the connected mode using context information stored therein. In addition, the MME of the relay UE may inform the MME of the remote UE of information about a cell, a TA, and an eNB, that the relay UE has accessed.

If change of information related to the relay UE (e.g., change of assigned temporary ID) or change of a connection state of the relay UE (e.g., deregistration or change of radio access technology (RAT)) occurs, the MME of the relay UE may inform the MME of the remote UE of information about the change.

The remote UE may intermittently generate traffic. Therefore, when there is no traffic for a while, the relay UE for relaying traffic of the remote UE cannot determine whether the remote UE has completed all data transmission. To solve this problem, when there is no more data to transmit or when it is determined that there will be no data to be generated for a predetermined time, the remote UE informs the relay UE or eNB of this fact. Then, the relay UE may request that the MME or eNB release ECM connection or RRC connection. Alternatively, when the eNB receives information indicating that there is no more data to transmit from the remote UE, the eNB may inform the MME that there is no more information to send or request that the MME release S1 connection.

Up to now, a description of how the network efficiently sends paging to the remote UE through the relay UE has been given. Hereinafter, a method for handover and group tracking area update (TAU) will be described. Under specific circumstances, multiple remote UEs may be linked to one relay UE and all of the linked remote UEs need to perform handover or TAU when the relay UE performs handover or updates a TA. For example, when a bus operates as a relay UE and passengers in the bus operate as remote UEs, if the bus should perform handover, other communication devices linked to the bus may also need to perform handover. Hereinafter, a group handover method for efficiently handing over remote UEs and a group TAU method for efficiently performing TAU will be described.

"Group handover" implies that a relay UE and remote UE(s) thereof perform handover together. This general concept may be realized in various ways, depending on which actual messages are combined. Distinction between "group handover command", "group handover response", and "group handover in network" may be made as follows. These three cases may coexist in various combinations and are potentially complementary approaches, not mutually exclusive alternatives.

Figure 15:
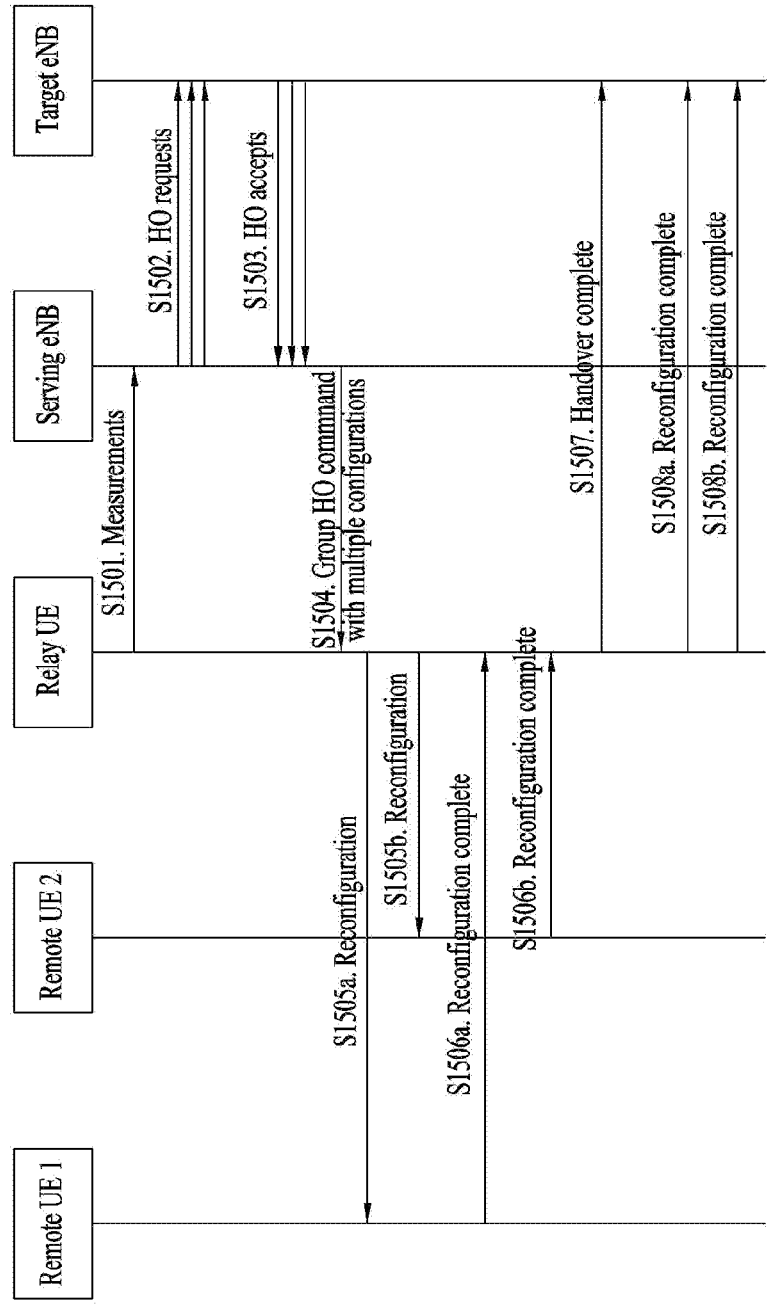
FIG. 15 illustrates a group handover command for group handover.

FIG. 15 illustrates a group handover command for group handover.

Referring to FIG. 15, "group handover command" means that a single message over Uu carries handover instructions for multiple remote UEs, possibly together with a relay UE.

The group handover command is a natural way to ensure that the handover procedures are synchronized. The relay UE needs to maintain an appropriate order of operations to guarantee that ReconfigurationComplete messages are forwarded to a target rather than a source.

The group handover command of S1504 may be an RRCConnectionReconfiguration message including mobilityControlInfo (for the relay UE) as well as multiple encapsulated reconfiguration messages (for forwarding to the remote UEs). The relay UE may recognize the group handover command and forward reconfigurations separately. However, the relay UE cannot recognize RRCReconfigurationComplete messages that are received as a response. Therefore, as illustrated in FIG. 8 (S1508a and S1508b), these messages cannot be grouped and may be forwarded to a target eNB separately. However, if a reconfiguration procedure is modified, it may be possible to group the handover responses, as discussed below.

The group handover command has an advantage of avoiding possible contention conditions upon handover (e.g., the relay UE performing handover before some of remote UEs have received their handover commands), as well as some advantages in latency.

Figure 16:
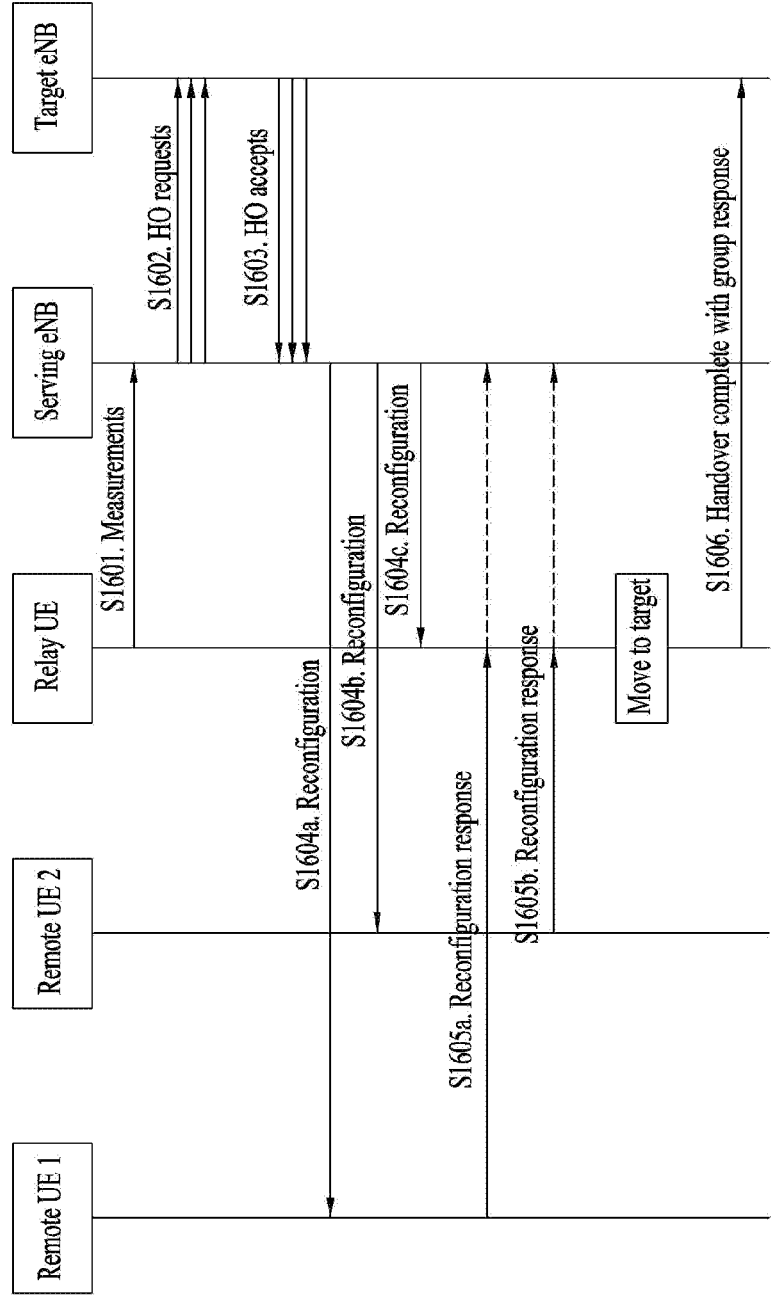
FIG. 16 illustrates a group handover response for group handover.

FIG. 16 illustrates a group handover response for group handover.

Referring to FIG. 16, "group handover response" means that reconfiguration messages are sent individually but responses are collected by either a relay UE or a source eNB and forwarded as a single message, "Reconfiguration response" messages of S1650a and S1605b may be sent either to the relay UE or a serving eNB, so long as in the end the relay UE is aware of which remote UEs will move therewith. When the relay UE sends a Handover Complete message thereof in S1606, the relay UE includes any needed information, e.g., IDs for the remote UEs that are completing handover.

For the remote UEs, the group handover response may represent a change to a reconfiguration procedure, so that the remote UEs respond either to the relay UE or to the serving eNB, rather than sending responses thereof to the target eNB.

The group handover response may support grouping in both the command and response messages, so that there is a single reconfiguration message from the source eNB followed by a single ReconfigurationComplete message to the target eNB, each combining parameters for the relay and remote UEs.

Figure 17:
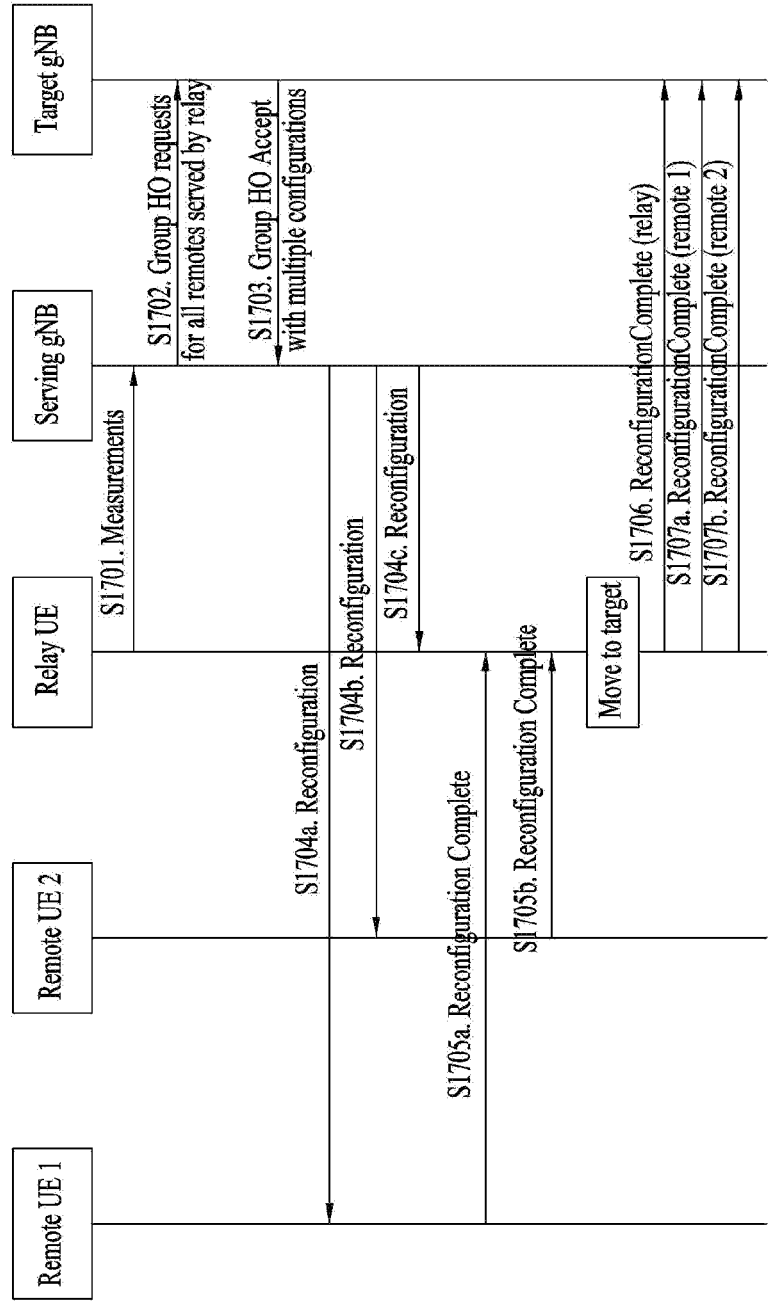
FIG. 17 illustrates group handover in network for group handover.

FIG. 17 illustrates group handover in network for group handover.

Referring to FIG. 17, finally, "group handover in network" means that air interface messages are sent individually but handover preparation messages on X2 are grouped. Group handover in network should be compatible with the group command and/or group response approaches described above.

Group handover in network is straightforward in concept but contains some challenges, mainly relating to controlling forwarding of messages so that ReconfigurationComplete messages of remote UEs are correctly sent to a target instead of a source.

Figure 18:
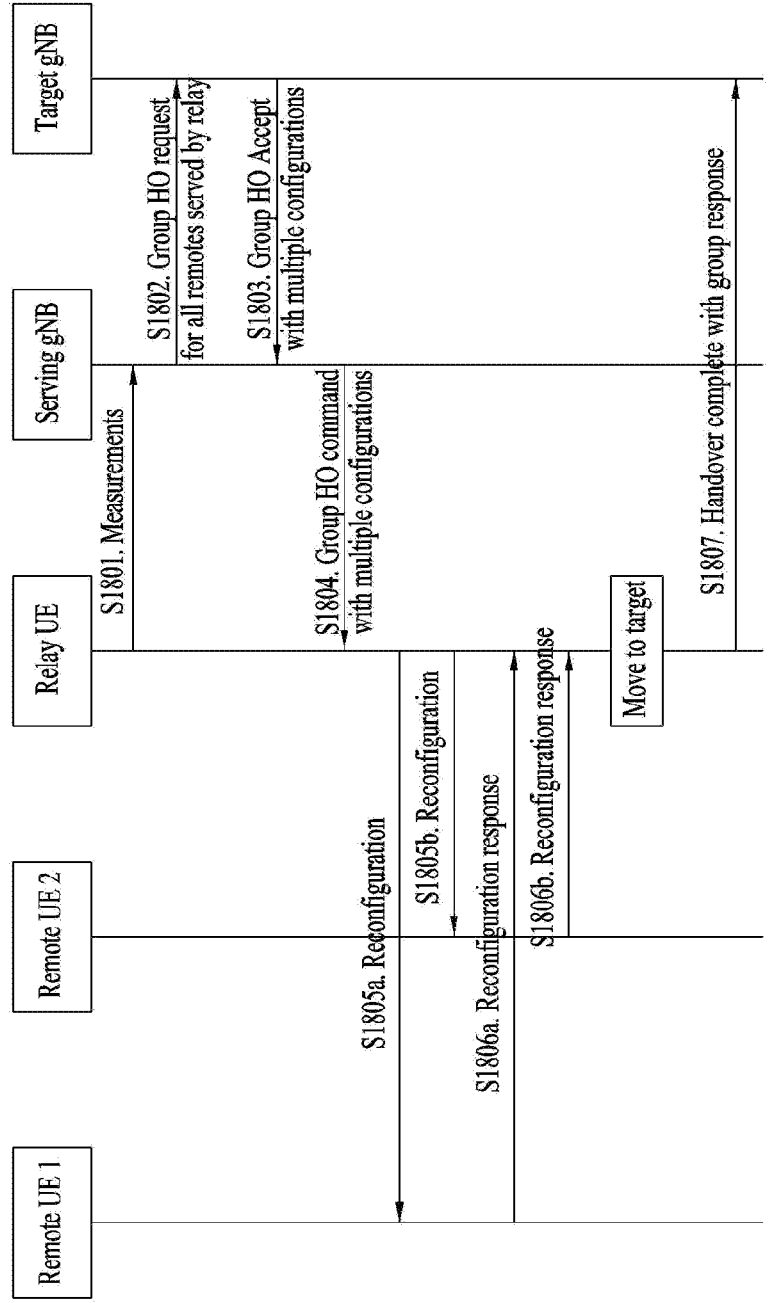
FIG. 18 illustrates a resulting message flow when a group handover command, a group handover response, and group handover in network are combined.

FIG. 18 illustrates a resulting message flow when a group handover command, a group handover response, and group handover in network are combined.

However, security such as a ciphering/integrity key, which is shared only between each remote UE and a network, is applied to some messages in FIGS. 15 to 18, e.g., the messages in S1805a, S1805b, S1806a, and S1806b of FIG. 18. For example, in FIG. 18, Group handover (HO) Accept with multiple configurations from a target gNB may include a message for a relay UE, a message for a remote UE1, and a message for a remote UE2 and may be transmitted by being encrypted with ciphering keys. The message for the remote UE1 is encrypted with the ciphering key of the remote UE1 and the message for the remote UE2 is ciphered with the ciphering key of the remote UE2 so that the encrypted messages will be included in the Group HO Accept message. In addition, a message transmitted by the remote UE1 will be encrypted with the ciphering key of the remote UE1 and a message transmitted by the remote UE2 will be encrypted with the ciphering key of the remote UE2. Since the relay UE is not aware of the ciphering keys of the remote UE1 and the remote UE2, the relay UE is incapable of deciphering the messages received in S1805a, S1805b, S1806a, and S1806b and is not aware of whether the corresponding messages are reconfiguration messages or reconfiguration response messages. Consequently, since the relay UE cannot be aware of whether the remote UE has sent a reconfiguration response message, the relay UE cannot be aware of when to send a handover complete message with a group response. To solve this problem, the following methods may be used.

The target gNB transmits information about a type of a message (e.g., a message of S1805) sent to each remote UE connected to the relay UE in addition to a message (e.g., a message of S1804) transmitted to the relay UE through a source gNB. The relay UE may be aware of which message has been sent to each remote UE in S1805 through this information. If there is a remote UE which is not handed over to the target gNB or cannot be handed over to the target gNB (due to HO rejection or RRC connection release) among remote UEs, the relay UE may be aware of such a remote UE and, for example, may determine whether to wait for a reconfiguration response. For example, when the target gNB indicates HO of the relay UE, the remote UE1, and the remote UE2 and HO of a remote UE3 is rejected or is not informed, if the remote UE1 and the remote UE2 send reconfiguration responses, the relay UE may also start to move to the target gNB.

Alternatively, the target gNB may transmit information about a remote UE to which HO should be granted and a remote UE to which HO need not be granted to the source gNB and the relay UE. For example, the following information is transmitted and this information may be transmitted to the source eNB: information about a remote UE to which HO to the target gNB is granted; and/or information about a remote UE for which HO is rejected.

Alternatively, upon receiving a HO command from the network, the relay UE informs remote UE(s) connected thereto of the HO command Each remote UE informs the relay UE of information as to whether the remote UE has completed HO preparation. Additionally, the remote UE may receive a message from the network, transmit a positive response to the message, and then inform the relay UE that HO preparation has been completed. If a remote UE connected to the relay UE informs the relay UE that HO preparation has been completed, the relay UE attempts to actually perform access to the target gNB.

In the case of a UE in a connected mode, the network may confirm the location of the UE in a cell unit. Therefore, the network may send data for the UE to a cell in which the UE is located. Since it is difficult for the network to confirm the location of the UE in an idle mode, the UE in the idle mode may inform the network of a TA thereof through a TAU request procedure when the TA thereof is changed so that the network will send paging later to a TA in which the UE is located. In consideration of the case in which multiple remote UEs are connected to the relay UE and the relay UE moves together with the remote UEs, introduction of a TAU for the relay UE to which the multiple remote UEs are linked is under consideration.

Figure 19:
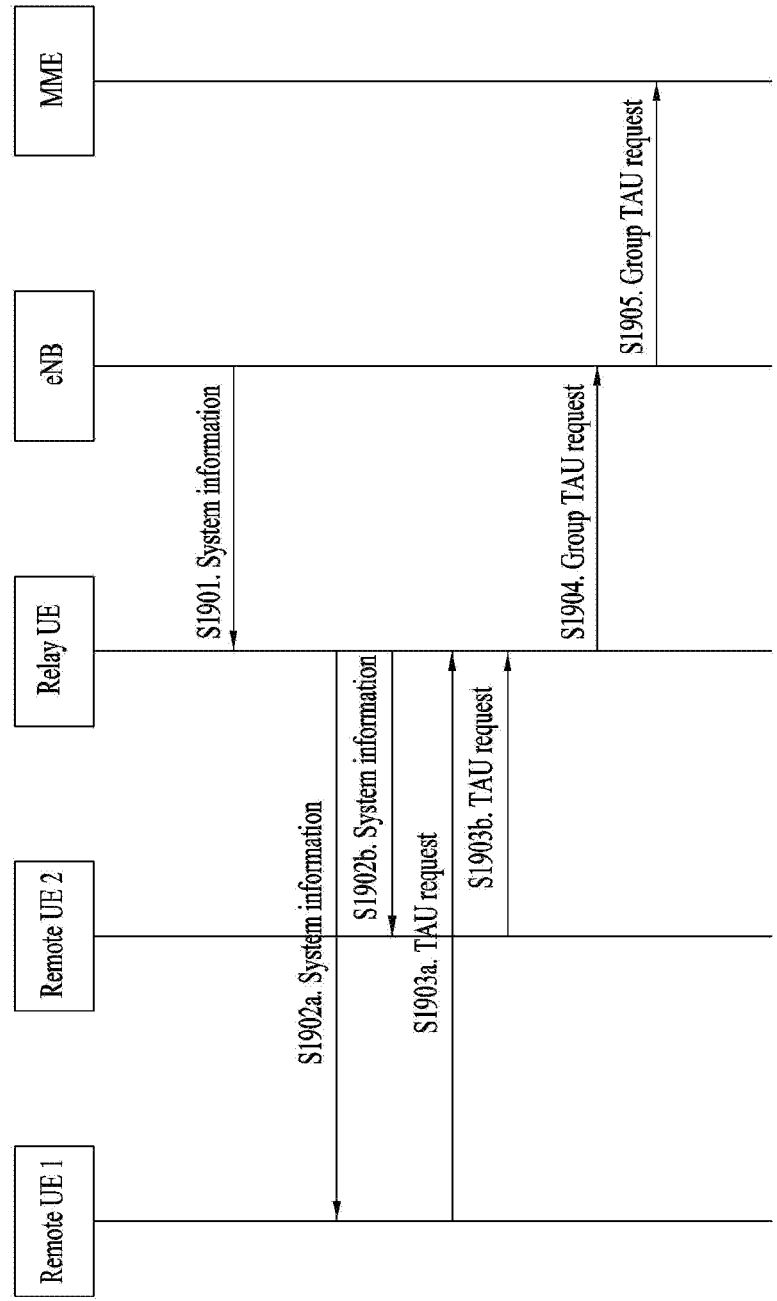
FIG. 19 illustrates the concept of group tracking area update.

FIG. 19 illustrates the concept of group TAU. Referring to FIG. 19, if a group TAU procedure is implemented in an access stratum (AS), this may imply that TAU messages sent by various remote UEs are collected at a relay UE and then sent together in a single UL message.

The group TAU procedure is less feasible than the group handover, for several reasons. The relay UE should delay a TAU procedure thereof to wait for possible TAU requests from remote UEs. Tracking area lists of the relay and the remote UEs may not be aligned, so the relay UE does not know in advance how many requests (if any) the relay UE should wait for. The remote UE and the relay UEs may have different MMEs. TAU request messages from the remote UEs are encrypted, so the relay UE cannot identify the messages as TAU requests. If information about through which bearer messages are transmitted is transmitted together on a PC5 interface, i.e., between the relay UE and the remote UEs, a NAS message such as TAU is transmitted through SRB2. Therefore, if any message is transmitted through SRB2, the message may be recognized as a TAU message. In the case in which the remote UEs come from RRC_IDLE, each TAU request is an initial UE message on an S1 interface, which means that the TAU requests cannot be batched together from the gNB to an MME. However, this does not conflict with batching on a radio interface. That is, even if the gNB receives TAU requests through one batch, UEs that have transmitted the TAU requests have a high possibility of being connected/set up to different MMEs rather than the same MME. In this case, since the TAU requests should be sent to corresponding MMEs to which UEs are connected, it is difficult for the gNB to batch the TAU requests and then transmit the TAU requests to the MMEs. Considering these problems, group TAU may be difficult to support if multiple TAU procedures from different UEs need to be combined in an AS. An alternative approach may be to handle group TAU in the relay UE by defining, in a NAS, that a mobility TAU or a periodic TAU is valid for the relay UE and all of the remote UEs in a group.

However, if multiple remote UEs linked to the relay UE are in different states, for example, in a state in which some remote UEs are in an idle mode and other remote UEs are in a connected mode, an operation in which the multiple remote UEs identically perform TAU causes the following problems. If the relay UE performs HO, a cell that the relay UE has accessed may be changed and a related TA may be changed. When the cell that the relay UE has accessed is changed and the TA is changed, if a remote UE in an idle mode does not rapidly recognize change of the TA, the remote UE does not proceed to a TAU procedure. In this state, if the network starts to page the remote UE, there may be a problem in which the network sends paging to a cell in which the remote UE has previously been located. To solve this problem, the following procedure may be performed.

When the relay UE enters a connected mode, the relay UE informs all remote UEs linked thereto that the relay UE has entered the connected mode. Upon receiving information indicating that the relay UE to which the remote UEs are linked has entered the connected mode, the remote UEs start an operation such as a service request so that the remote UEs also enter the connected mode. That is, according to the present disclosure, if the relay UE enters the connected mode, a remote UE linked to the relay UE also transitions to the connected mode. Therefore, the network may recognize the location of the remote UE in a cell unit and, if the relay/remote UE is also in the connected mode, since the relay/remote UE may be immediately aware of whether a cell in which the relay/remote UE is located is changed, the relay/remote UE may immediately recognize a TA. In this case, the remote UE sets a cause to 'relay enters connected mode' or similar information in a service request message so as to cause the network to be aware of the reason why the remote UE starts to perform the service request. Although the network manages the remote UE as the connected mode using the cause value, setup of a user plane for the remote UE may be omitted. Then, when the remote UE performs actual transmission or receives paging, the remote UE performs the service request again to inform the network of necessity of data transmission/reception.

As another method, the relay UE may manage a context for each of remote UEs linked thereto and confirm whether each remote UE is in a connected state or an idle state within the context. When the relay UE is handed over to a new cell, the relay UE informs the remote UE that the relay UE has moved to the new cell. In this case, the relay UE may transmit system information received from the new cell to the remote UE. The remote UE in an idle mode may perform the TAU procedure when necessary based on the system information received from the relay UE.

Figure 20:
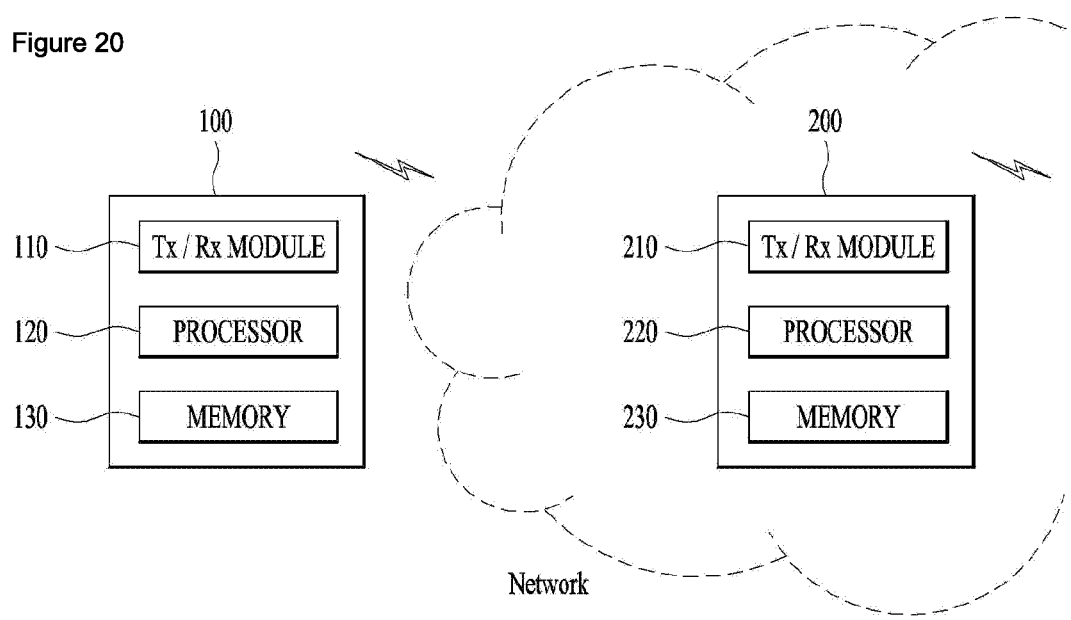
FIG. 20 illustrates a node device applied to the proposal of the present disclosure.

FIG. 20 illustrates configuration of a UE and a network node according to a preferred embodiment of the present disclosure.

The UE 100 according to the present disclosure may include a transmission/reception (Tx/Rx) module 110, a processor 120, and a memory 130. The Tx/Rx module 110 of the UE (100) may be referred to as a radio frequency (RF) unit, when communicating with the UE (100). The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 20, the network node 200 according to the present disclosure may include a Tx/Rx module 210, a processor 220 and a memory 230. The Tx/Rx module 210 may be referred to as an RF unit. The Tx/Rx module 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown). In an access network, the network node 200 may be an eNB or a gNB. In a core network, the network node 200 may be an MME device.

For configuration of the UE 100 and the network apparatus, the details described in various embodiments of the present disclosure may be independently applied or implemented such that two or more embodiments are simultaneously applied. For simplicity, redundant description is omitted.

The processor of the gNB may control the Tx/Rx module to transmit information about a remote UE connected to a network of the gNB to an MME of a relay UE through the relay UE or transmit information about the relay UE to an MME of the remote UE.

The processor of the MME which has received the information about the relay UE to which the remote UE is linked from the gNB or from the MME of the relay UE may control the Tx/Rx module of the MME of the remote UE to transmit, to the MME of the relay UE, a paging request message for requesting that the MME of the relay UE perform paging when paging for the remote UE is needed, while the remote UE is connected to the network through the relay UE, i.e., while there is no direct RRC connection established between the remote UE and the network. If the Tx/Rx module of the MME of the relay UE receives the paging request message for the remote UE from the MME of the remote UE, the processor of the MME of the relay UE may control the Tx/Rx module of the relay UE to transmit a paging message including paging for the remote UE or a paging message indicating that there is paging for the remote UE to gNB(s) of a cell to which the relay UE belongs, gNB(s) of a TA to which the relay UE belongs, or a gNB to which the relay UE belongs.

The processor of the gNB receives the paging message from the MME of the relay UE and, if the relay UE is in an idle mode, the processor of the gNB initiates a paging procedure for causing the relay UE to transition to a connected mode. That is, when the relay UE is not in the connected mode, the processor of the gNB controls the Tx/Rx module of the gNB to transmit the paging message on a PO of the relay UE. The processor of the gNB receives the paging message from the MME of the relay UE and, if the relay UE is in the connected mode, the processor of the gNB transmits the paging message through RRC connection between the relay UE and the gNB. If the gNB receives information indicating that the paging message is caused by the remote UE linked to the relay UE from the MME of the relay UE together with the paging message, the processor of the gNB may control the Tx/Rx module to transmit information indicating that the paging message is caused by the remote UE linked to the relay UE upon transmitting the paging message to the relay UE.

The processor of the relay UE controls the Tx/Rx module of the relay UE to monitor the paging message on a PO thereof when the relay UE is not in the connected mode. For example, the processor of the relay UE in an idle mode monitors a PDCCH addressed to a paging RNTI (P-RNTI) on a PO thereof according to a UE ID thereof. If the processor of the relay UE receives the PDCCH addressed to the P-RNTI on a PO thereof, the processor of the relay UE may control the Tx/Rx module of the relay UE to receive a PDSCH carrying the paging message based on the PDCCH. Upon receiving the paging message on the PO, the processor of the relay UE may control the Tx/Rx module to start an RRC connection establishment procedure with the gNB. If the relay UE is in the connected mode, the processor of the relay UE may control the Tx/Rx module of the relay UE to monitor the PDCCH (using a C-RNTI etc.) for DL data channel reception. Upon receiving (DL data channel carrying) paging notification for the remote UE while the relay UE is in the connected mode, the processor of the relay UE may control the Tx/Rx module of the relay UE to transmit the paging notification to the remote UE through direct communication connection between the relay UE and the remote UE.

The embodiments of the present disclosure may be implemented through various means. For example, the embodiments may be implemented by hardware, firmware, software, or a combination thereof.

When implemented by hardware, a method according to embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present disclosure has been given to enable those skilled in the art to implement and practice the disclosure. Although the disclosure has been described with reference to exemplary embodiments, those skilled in the art will appreciate that various modifications and variations can be made in the present disclosure without departing from the spirit or scope of the disclosure described in the appended claims. Accordingly, the disclosure should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:

1. A method of performing paging by a base station (BS) in a wireless communication system, the method comprising:
    transmitting, to a first mobility management entity (MME) for a remote user equipment (UE), an identity of a second MME for a relay UE to which the remote UE is linked;
    receiving a first paging message from the second MME; and
    transmitting a second paging message including the first paging message to the relay UE,
    wherein the first paging message includes information indicating that there is paging for the remote UE or includes paging for the remote UE, and
    wherein the second paging message causes the relay UE to perform a service request procedure for setting up at least one evolved packet system (EPS) bearer and inform the first MME that the service request procedure is performed for traffic transmission of the remote UE.

2. The method of claim 1, wherein the identity of the second MME is transmitted to the first MME upon receiving a registration request message for the remote UE through a radio resource control (RRC) connection established between the relay UE and the BS.

3. The method of claim 1, wherein, based on the second paging message being transmitted while the relay UE is in an idle mode, the second paging message is transmitted on a paging occasion of the relay UE.

4. The method of claim 1, further comprising:
    receiving information indicating that the first paging message is related to the remote UE, together with the first paging message, from the second MME; and
    transmitting information indicating that the second paging message is related to the remote UE, together with the second paging message, to the relay UE.

5. A base station (BS) for performing paging in a wireless communication system, the BS comprising,
    a transmitter and a receiver, and
    a processor configured to control the transmitter and the receiver, the processor configured to:
    control the Tx/Rx module to transmit, to a first mobility management entity (MME) for a remote user equipment (UE), an identity of a second MME for a relay UE to which a remote UE is linked;
    control the receiver to receive a first paging message from the second MME; and
    control the transmitter to transmit a second paging message including the first paging message to the relay UE,
    wherein the first paging message includes information indicating that there is paging for the remote UE or includes paging for the remote UE, and
    wherein the second paging message causes the relay UE to perform a service request procedure for setting up at least one evolved packet system (EPS) bearer and inform the first MME that the service request procedure is performed for traffic transmission of the remote UE.

6. The BS of claim 5, wherein the processor is further configured to control the transmitter to transmit the identity of the second MME to the first MME upon receiving a registration request message for the remote UE through a radio resource control (RRC) connection established between the relay UE and the BS.

7. The BS of claim 5, wherein, based on the second paging message being transmitted while the relay UE is in an idle mode, the processor is further configured to control the transmitter to transmit the second paging message on a paging occasion of the relay UE.

8. The BS of claim 5, wherein the processor is further configured to:
    control the receiver to receive information indicating that the first paging message is related to the remote UE, together with the first paging message, from the second MME; and
    control the transmitter to transmit information indicating that the second paging message is related to the remote UE, together with the second paging message, to the relay UE.

9. A first mobility management entity (MME) for a remote user equipment (UE) for supporting paging in a wireless communication system, the first MME comprising:
    a transmitter and a receiver, and
    a processor configured to control the transmitter and the receiver, wherein the processor is further configured to:
    control the receiver to receive an identity of a second MME for a relay UE and a registration request message for the remote UE from a base station (BS); and
    control the transmitter to transmit a paging request message for the remote UE to the second MME, when downlink data for the remote UE is received and when the remote UE is connected to a network through the relay UE,
    wherein the paging request message causes the relay UE to perform a service request procedure for setting up at least one evolved packet system (EPS) bearer and inform the first MME that the service request procedure is performed for traffic transmission of the remote UE.

10. The first MME of claim 9, wherein the paging request message includes information about the relay UE, information about the remote UE, or information about the first MME.

11. A second mobility management entity (MME) for a relay user equipment (UE) for supporting paging in a wireless communication system, the second MME comprising:
    a transmitter and a receiver, and
    a processor configured to control the transmitter and the receiver, wherein the processor is further configured to:
    control the receiver to receive a paging request message for the remote UE from a first MME for a remote UE; and
    control the transmitter to transmit a paging message to a base station (BS) serving for the relay UE based on the paging request message,
    wherein the paging message includes information indicating that there is paging for the remote UE or includes paging for the remote UE,
    wherein the paging message causes the relay UE to perform a service request procedure for setting up at least one evolved packet system (EPS) bearer and inform the first MME that the service request procedure is performed for traffic transmission of the remote UE.

12. The second MME of claim 11, wherein the paging request message includes information about the relay UE, information about the remote UE, or information about the first MME.

* * * * *